(12) United States Patent
Torita et al.

(10) Patent No.: US 6,771,310 B1
(45) Date of Patent: Aug. 3, 2004

(54) IMAGE PICKUP APPARATUS WITH OPTICAL BEAM SHIFTING WITH INDEPENDENTLY CONTROLLED OPTICAL ELEMENTS

(75) Inventors: Tomohiko Torita, Chichibu (JP); Koichi Shimada, Yokoze-machi (JP)

(73) Assignee: Canon Denshi Kabushiki Kaisha, Saitama-ken (JP)

( * ) Notice: Subject to any disclaimer, the term of this patent is extended or adjusted under 35 U.S.C. 154(b) by 0 days.

(21) Appl. No.: 08/902,575

(22) Filed: Jul. 29, 1997

(30) Foreign Application Priority Data

Jan. 14, 1997 (JP) .......................................... 09-004476
Apr. 23, 1997 (JP) .......................................... 09-106047
Jul. 22, 1997 (JP) .......................................... 09-195569

(51) Int. Cl.[7] .......................................... H04N 5/225
(52) U.S. Cl. .................................. 348/219.1
(58) Field of Search ................................. 348/208, 218, 348/219, 222, 351, 335, 337, 340, 344, 208.99, 208.1, 218.1, 219.1, 222.1; 250/208.1, 216; 359/557, 813, 814, 822, 824, 737; 396/52, 55, 111; 382/299

(56) References Cited

U.S. PATENT DOCUMENTS 4,770,515 A * 9/1988 Hily et al. .................. 359/737
5,400,070 A * 3/1995 Johnson et al. ............. 348/219
5,637,861 A * 6/1997 Okada et al. ............ 250/208.1
5,877,806 A * 3/1999 Kawano ...................... 348/219
5,920,342 A * 7/1999 Umeda et al. .............. 348/219
6,473,121 B1 * 10/2002 Shimada ..................... 348/219
2003/0146980 A1 * 8/2003 Shimada .................. 348/218.1

FOREIGN PATENT DOCUMENTS

| EP | 0483530 | 5/1992 |
| EP | A-0 483 530 | 5/1992 |
| EP | 0669757 | 8/1995 |
| EP | 0689349 | 12/1995 |
| EP | A-0 689 349 | 12/1995 |

* cited by examiner

Primary Examiner—Aung Moe
(74) Attorney, Agent, or Firm—Robin, Blecker & Daley

(57) ABSTRACT

An optical apparatus includes an optical element for shifting an incident position of a light beam on an image forming plane, a plurality of restricting portions for controlling an inclination position of the optical element with respect to an optical axis by respectively coming into abutment with end portions of the optical element and restricting positions of the respective end portions in a direction of the optical axis, and a driving part for driving the optical element to bring the optical element into abutment with the restricting portions. Each of the restricting portions has position restricting surfaces formed before and behind a corresponding one of the end portions of the optical element in the direction of the optical axis, and an inclination angle of the optical element relative to the optical axis is determined in such a way that the position of each of the end portions in the direction of the optical axis is restricted by the position restricting surfaces in a corresponding one of the restricting portions.

25 Claims, 27 Drawing Sheets

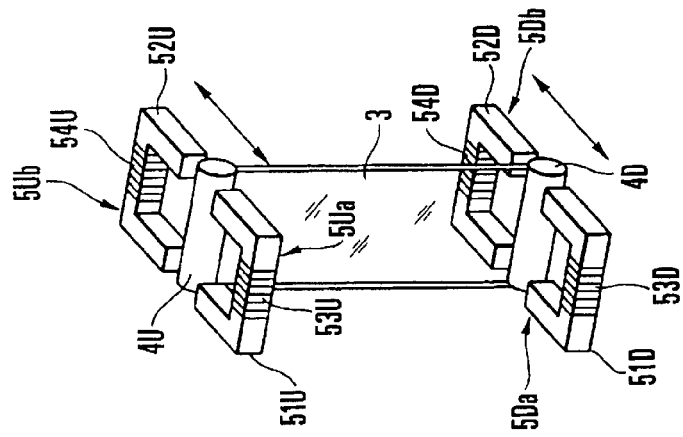
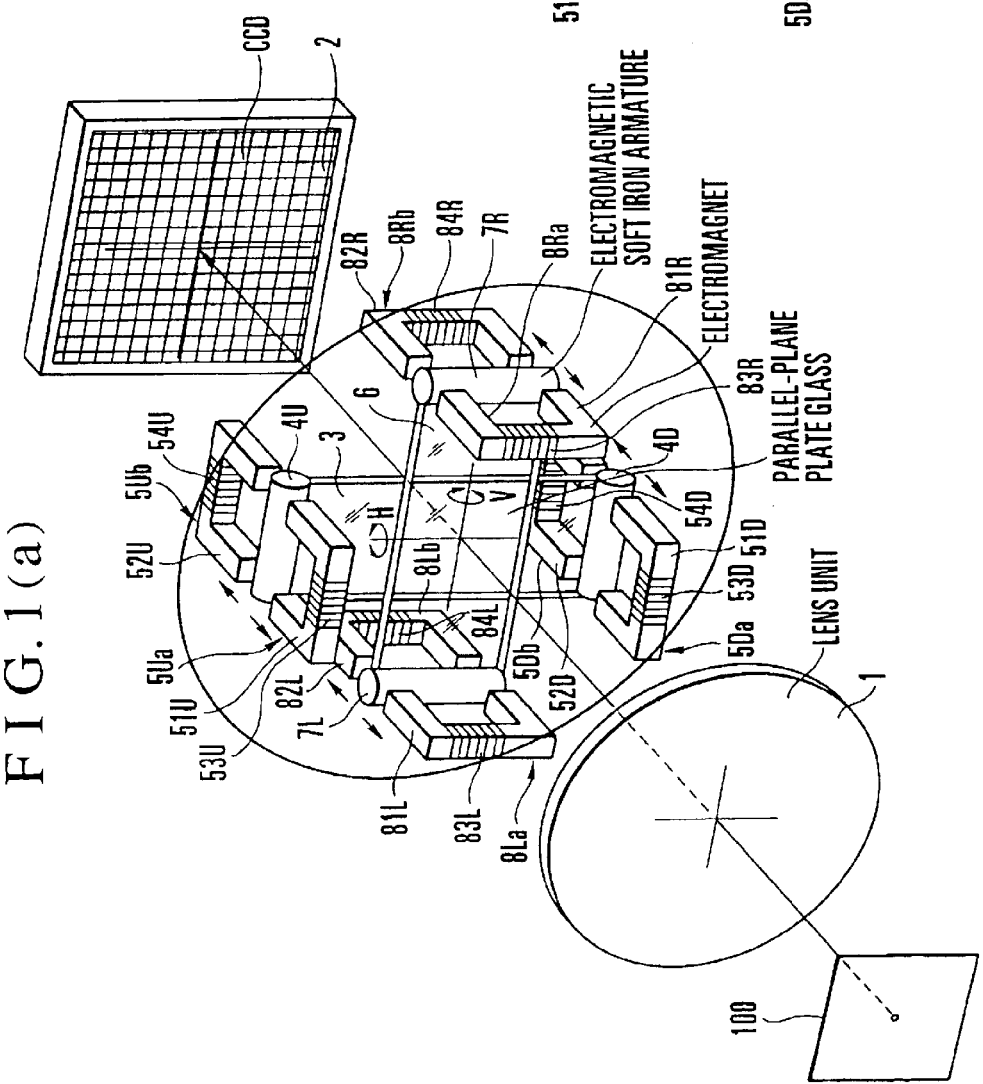

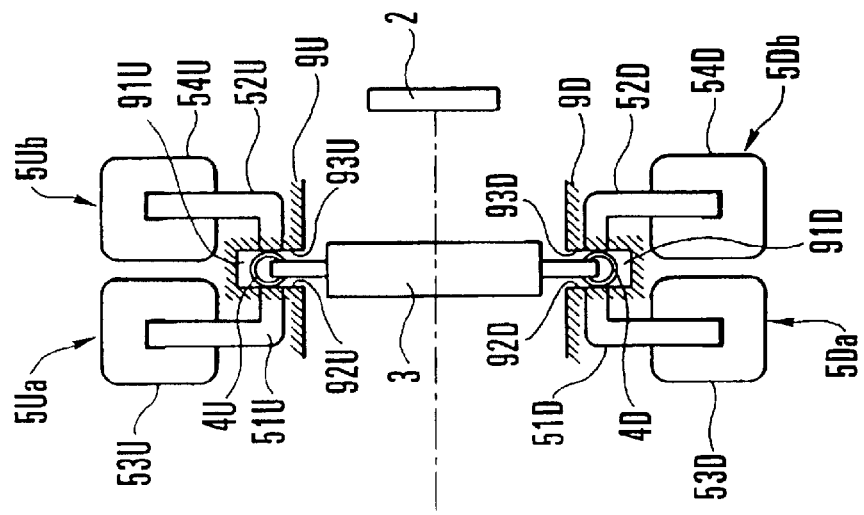
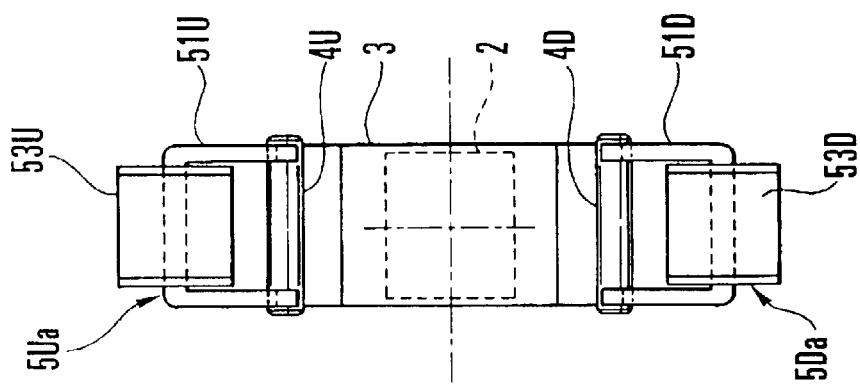

F I G. 15
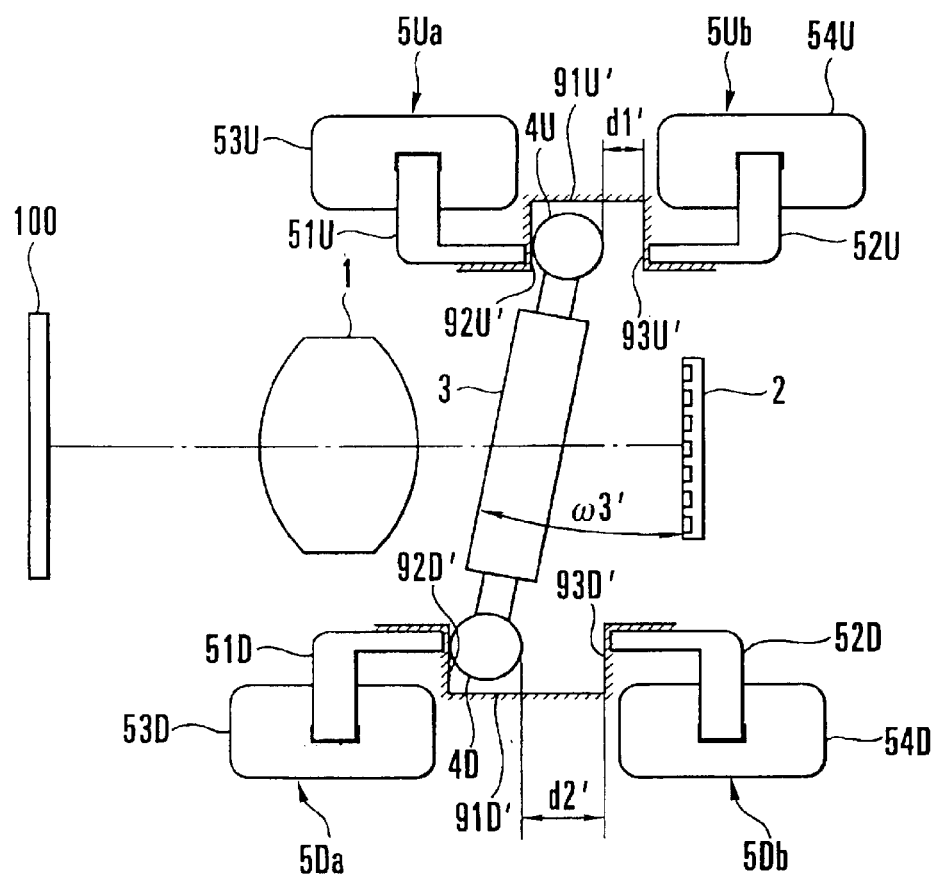

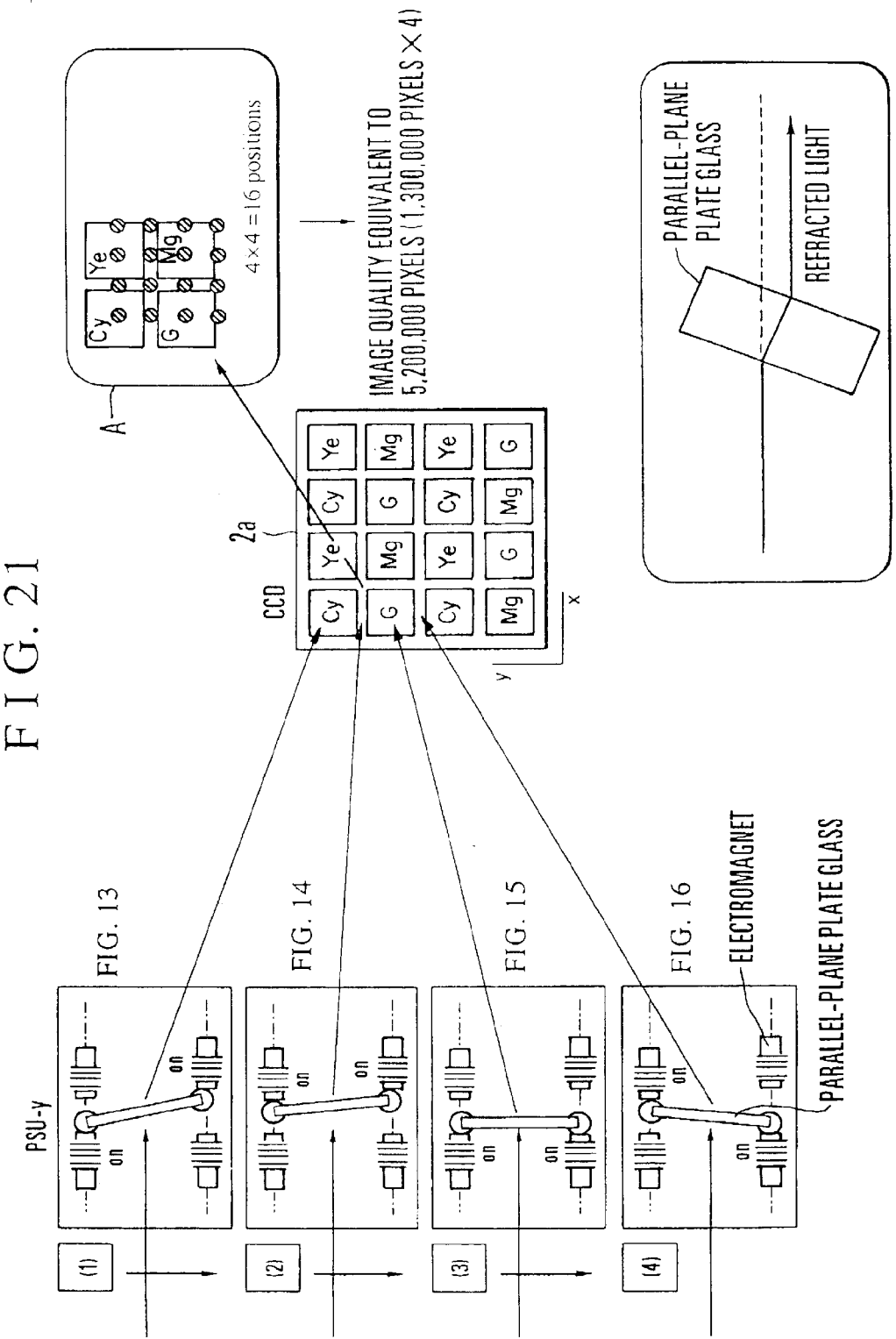

F I G. 22(a)
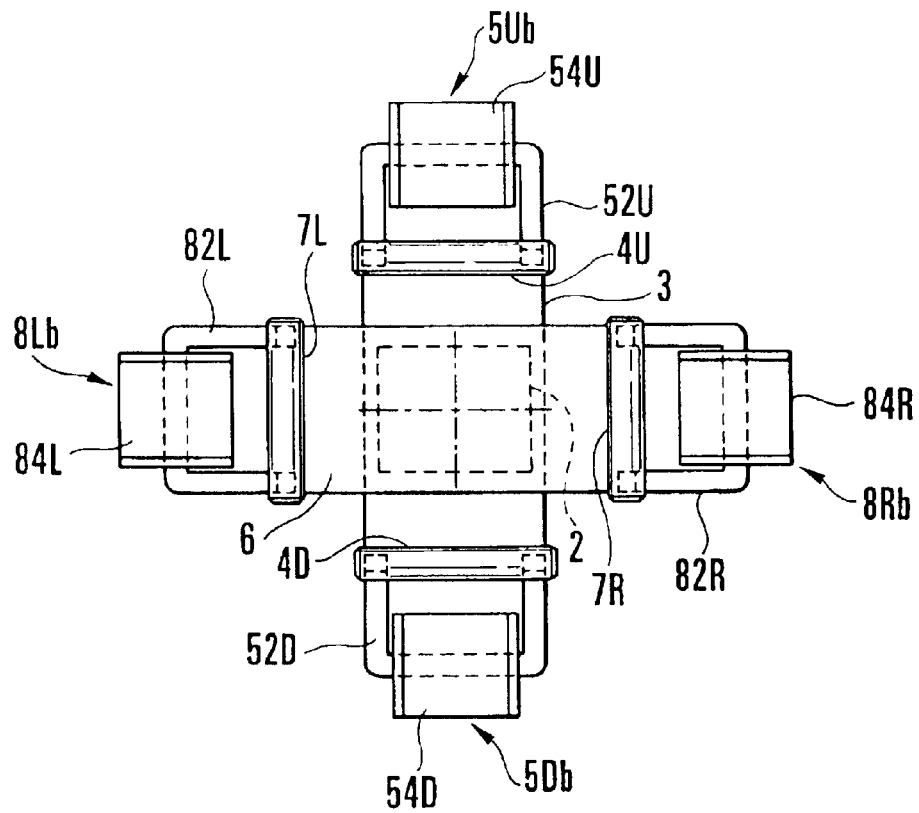
F I G. 22(b)
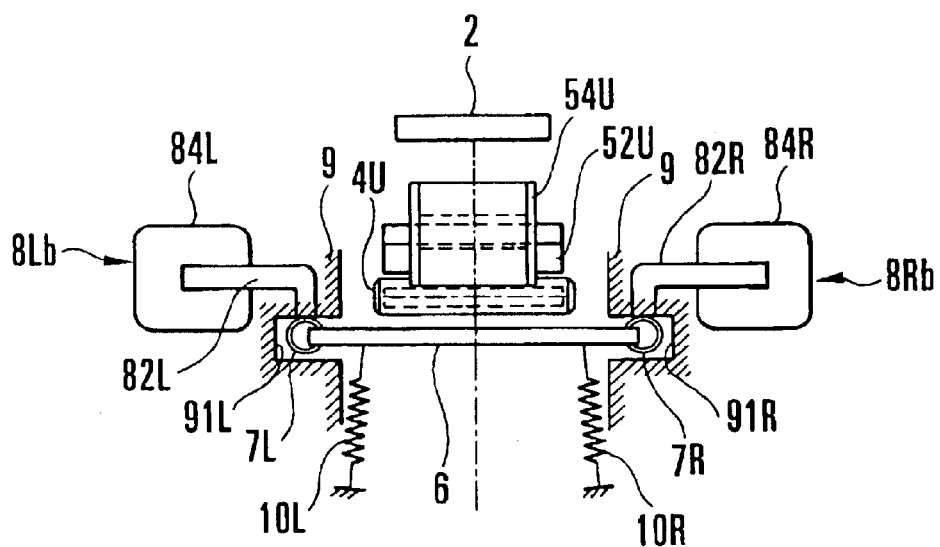

IMAGE PICKUP APPARATUS WITH OPTICAL BEAM SHIFTING WITH INDEPENDENTLY CONTROLLED OPTICAL ELEMENTS

BACKGROUND OF THE INVENTION

1. Field of the Invention

The present invention relates to an image pickup apparatus capable of inputting an image of substantially high image quality by finely varying the optical angle of a parallel-plane plate glass or a reflecting mirror which is provided in the optical path of an image pickup system.

2. Description of Related Art

In recent years, image input apparatus such as video cameras and scanners have made remarkable advances, and far higher image quality and far higher resolution have been strongly demanded. However, to increase the number of pixels per image pickup element involves a number of problems, such as performance problems such as a lowering in sensitivity or S/N, an increase in cost due to a decrease in production yield, and the necessity for an expensive quartz-crystal low-pass filter or the like for preventing a false signal or the like.

What is called "pixel shifting" is known as a method of increasing the image quality and the resolution of an image pickup apparatus without increasing the number of pixels per image pickup element. The pixel shifting is a method of finely vibrating an image pickup element itself or sequentially obtaining optical-video information by conducting, to photosensitive portions on the image pickup element, optical-image information which would have reached non-photosensitive portions between adjacent photosensitive portions, while varying the reflection angle of a reflecting mirror disposed in an optical path in an optical relay space between a lens group and the image pickup element or while varying the incident angle of light on an optical transmission glass having the shape of a parallel-plane plate or varying the thickness of the optical transmission glass by using the refraction of light by the optical transmission glass which is disposed in such optical path. According to such pixel shifting, it is possible to obtain an image having a high resolution which is substantially equivalent to a resolution obtainable when the number of pixels of an image pickup element is increased.

Since this method makes it possible to pick up an image of high image quality without increasing the number of pixels of the image pickup element itself, the pixel shifting is a method which is extremely effective in increasing the resolution of the image input apparatus.

Specific examples of pixel shifting using the above-described principles have been disclosed. For example, Japanese Laid-Open Patent Application No. Sho 59-15378 discloses the art of rotating a parallel-plane plate about an axis parallel to a pixel array, Japanese Laid-Open Patent Application No. Hei 1-121816 discloses the art of inclining a parallel-plane plate surface and rotating it about an optical axis, and Japanese Laid-Open Utility Model Application No. Hei 6-8937 discloses the art of driving a cam mechanism by means of a motor and varying the inclination of a parallel-plane plate surface in the directions of X and Y axes.

However, in any of the above-described conventional mechanism examples which use a parallel-plane plate optical-transmission glass, a motor is used as a drive source which varies the optical position of the parallel-plane plate optical-transmission glass and a complicated expensive mechanism such as a position control mechanism using a cam, with the result that it is difficult to ensure the positioning accuracy of the parallel-plane plate optical-transmission glass and it is also difficult to increase the driving speed thereof.

If two horizontal and vertical systems each including a motor, a cam and a mechanism for transmitting the drive force of the motor are incorporated in an image pickup apparatus, a number of problem will occur; for example, the entire pixel shifting mechanism necessarily become larger in size and difficult to dispose in the space between the lens group and the image pickup element.

BRIEF SUMMARY OF THE INVENTION

The present invention has been made to solve the above-described problems, and its first object is to provide a pixel shifting method, an optical (pixel shifting) apparatus and an image pickup apparatus all of which are capable of realizing high-speed driving by using a simple arrangement.

A second object of the present invention is to provide a pixel shifting method and an optical (pixel shifting) apparatus both of which are capable of realizing pixel shifting of multiple steps and control of the amount of pixel shifting by using an extremely simple arrangement without the need for a complicated arrangement.

A third object of the present invention is to provide an optical apparatus which enables pixel shifting which is easy to control and can be driven at extremely high speed without the need for a complicated mechanism.

To achieve the above objects, in accordance with one aspect of the present invention, there is provided an optical apparatus which comprises an optical element for shifting a position of an incident light beam on an image forming plane, a plurality of restricting portions for controlling an inclination position of the optical element with respect to an optical axis by respectively restricting end portions of the optical element, and driving means for driving the optical element to the restricting portions.

To achieve the above objects, in accordance with another aspect of the present invention, there is provided an optical apparatus which has position restricting surfaces formed before and behind each end portion of an optical element in the direction of the optical axis and determines the inclination angle of the optical element relative to the optical axis by restricting the position of each end portion of the optical element in the direction of the optical axis by means of the position restricting surfaces, the optical element being capable of being controlled to move among a plurality of inclination angles, by modifying a combination of the position restricting surfaces which the end portions of the optical element selectively come into abutment with.

In accordance with another aspect of the present invention, there is provided an optical apparatus in which a drive source for driving a parallel-plane plate disposed in an image pickup optical system includes a plurality of electromagnets and is arranged to vary the inclination position of the optical element by performing on-off control of each of the electromagnets to select the position restricting surfaces which the optical element comes into abutment with.

In accordance with another aspect of the present invention, there is provided an optical apparatus which is provided with a plurality of optical elements and a plurality of restricting portions and is arranged to determine an entire amount of image shifting by combining the amounts of image shifting of a light beam according to the respective inclination positions of the plurality of optical elements.

A fourth object of the present invention is to integrate a pixel shifting mechanism with an optical apparatus as one unit and improve the applicability of the pixel shifting mechanism to various lens units and cameras as well as the versatility of the pixel shifting mechanism.

A fifth object of the present invention is to provide a lens unit in which a pixel shifting mechanism is incorporated.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIGS. 1(a) and 1(b) are diagrammatic perspective views aiding in explaining the arrangement and the operation principle of a pixel shifting system according to a first embodiment of the present invention;

FIGS. 2(a) and 2(b) are diagrammatic views aiding in explaining the arrangement and the operation principle of the pixel shifting system according to the first embodiment of the present invention;

FIG. 15 is a diagrammatic view aiding in explaining the vertical pixel shifting operation of the pixel shifting system according to the second embodiment of the present invention;

FIG. 21 is a diagrammatic view showing the operation of the second embodiment of the present invention;

FIGS. 22(a) and 22(b) are diagrammatic views showing the arrangement of a third embodiment of the present invention;

DETAILED DESCRIPTION OF THE INVENTION

Preferred embodiments of the image pickup apparatus according to the present invention will be described below.

First of all, description will be made in connection with the operation principle of "pixel shifting" which makes it possible to pickup up an image of high image quality by shifting the incident position of light incident on a image pickup surface of an image pickup element, on a pixel-by-pixel basis on the image pickup surface.

Figure 26A:
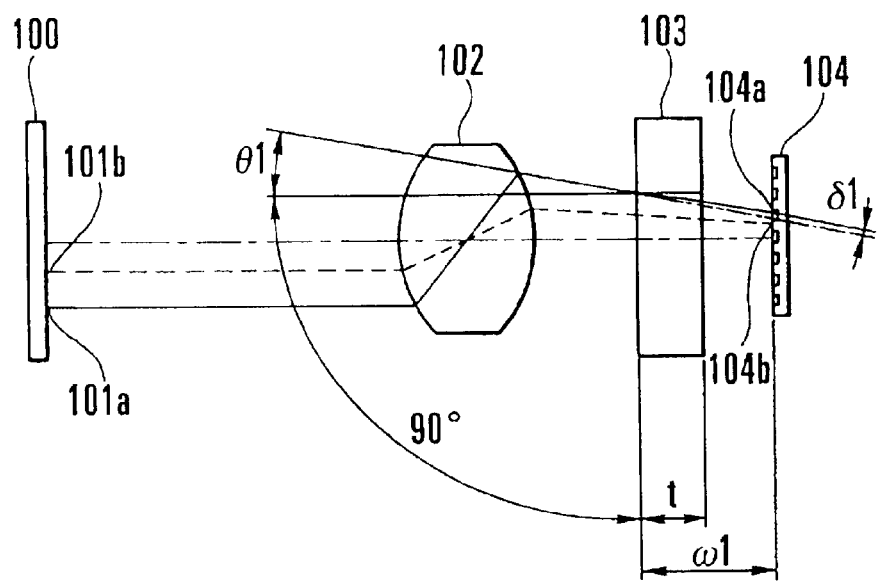
FIGS. 26(a) and 26(b) are views showing the principle of pixel shifting.

The principle of optical-path shifting which uses refraction of light by a parallel-plane plate optical transmission glass will be described below with reference to FIGS. 26(a) and 26(b). FIG. 26(a) shows a state before an optical path is shifted, while FIG. 26(b) shows a state after the optical path is shifted.

Figure 26B:
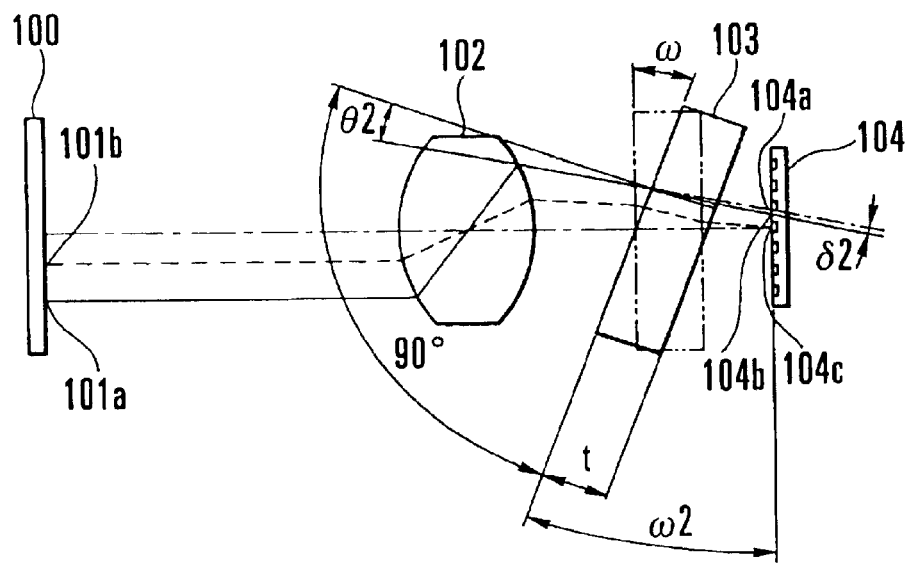

In FIGS. 26(a) and 26(b), reference numeral 100 denotes a subject such as a document an image of which to be picked up, reference numeral 102 denotes an image pickup lens group, and reference numeral 103 denotes an optical element made of an optically transmissive substance. The optical element 103 is disposed so that it can incline with respect to the optical axis of the optical system, and is shaped like a parallel-plane plate having a uniform refractive index and serves as light-beam moving means. Reference numeral 104 denotes a solid-state image pickup element such as a CCD which serves as image pickup means for photoelectrically converting a light image of the subject 100 focused by the lens group 102 and outputting the obtained picked-up image signal.

As shown in FIG. 26(a), light from a point 101a on the subject 100 passes through the lens group 102 and the optical element 103 and is made incident on a photosensitive portion 104a of the solid-state image pickup element 104, so that the incident light is photoelectrically converted into valid data.

On the other hand, light from a point 101b on the subject 100 passes through the lens group 102 and the optical element 103 and is made incident on a non-photosensitive portion 104b between adjacent photosensitive portions of the solid-state image pickup element 104, but the incident light is not photoelectrically converted and is wasted as invalid data.

Letting $\delta 1$ be the amount of deviation of light between the direction in which the light enters the optical element 103 and the refraction direction in which the light exits from the optical element 103, letting $\theta 1$ be the angle made by the entering light and the normal to the entrance surface of the optical element 103, letting t be the thickness of the optical element 103, and letting N be the refractive index of the optical element 103, the following equation is obtained:

$$\delta 1 = (1 - 1/N) \cdot t \cdot \theta 1.$$

The angle made by the optical element 103 and the image pickup surface of the solid-state image pickup element 104 at this time is denoted by $\omega 1$ for convenience' sake.

FIG. 26(b) shows a state in which the inclination of the optical element 103 is varied by $\omega = (\omega 2 - \omega 1)$.

In FIG. 26(b), letting $\delta 2$ be the amount of deviation of light between the direction in which the light enters the optical element 103 and the refraction direction in which the light exits from the optical element 103, and letting $\theta 2$ be the angle made by the entering light and the normal to the entrance surface of the optical element 103, the following equation is obtained:

$$\delta 2 = (1 - 1/N) \cdot t \cdot \theta 2,$$

where t is the thickness of the optical element 103 and N is the refractive index of the optical element 103.

Here, a deviation $\delta$ of the light which exits from the optical element 103 toward the solid-state image pickup element 104 when the optical system changes from the state of FIG. 26(a) to the state of FIG. 26(b) is expressed as $$\begin{aligned}\delta &= \delta 1 + \delta 2 \\ &= (1 - 1/N) \cdot t \cdot (\theta 1 + \theta 2) \\ &= (1 - 1/N) \cdot t \cdot (\omega 2 - \omega 1),\end{aligned}$$

so that $$\delta = (1 - 1/N) \cdot t \cdot \omega.$$

During the state of FIG. 26(a), the light information from the point 101b on the subject 100 is made incident on the non-photosensitive portion 104b on the solid-state image pickup element 104 and is wasted as invalid data. However, if the state of FIG. 26(a) is changed to the state of FIG. 26(b), it is possible to make the light information from the point 101b incident on a photosensitive portion 104c of the solid-state image pickup element 104, so that the light information can be used as valid data.

If the picked-up image data obtained in the state of FIG. 26(a) and the picked-up image data obtained in the state of FIG. 26(b) are stored in a memory and the stored data are combined after phase-corrected, it is possible to obtain the amount of data which is equivalent to twice the number of pixels of the solid-state image pickup element 104.

On the basis of the above-described principle, if the optical element 103 is made stationary at several inclination positions and light information received by the solid-state image pickup element 104 for each of the inclination positions is stored in the memory, it is possible to obtain image information the amount of which is equivalent to several times the number of photosensitive portions of the solid-state image pickup element 104.

The fundamental principle of "pixel shifting" itself is as described above, and preferred embodiments of the present invention will be described below.

First Embodiment

A first embodiment of the present invention comprises a horizontal shifting mechanism and a vertical shifting mechanism both of which are provided between an image pickup lens and an image pickup element (CCD), and the horizontal shifting mechanism includes a parallel-plane plate glass for shifting a light beam entering from the image pickup lens, in a horizontal direction on an image pickup surface of the image pickup element, whereas the vertical shifting mechanism includes a parallel-plane plate glass for shifting such light beam in a vertical direction on the image pickup surface of the image pickup element.

FIGS. 1(a) and 1(b) are diagrammatic perspective views showing the arrangement of a pixel shifting system in an image pickup apparatus according to the first embodiment of the present invention. In FIGS. 1(a) and 1(b), an image pickup lens unit 1 constitutes an optical system, and an image pickup element 2 such as a CCD constitutes image pickup means. A transmission parallel-plane plate glass 3 (hereinafter referred to as the parallel-plane plate 3) is made of glass or plastics and constitutes a (vertical) optical element for vertically shifting a light beam passing through the image pickup lens unit 1 on an image pickup surface (image forming surface) of the image pickup element 2. Armatures 4U and 4D of electromagnetic soft iron, each of which constitutes an engagement part, are respectively disposed at the opposite ends of the parallel-plane plate 3, and electromagnets 5Ua and 5Ub; 5Da and 5Db which constitute driving means (electromagnetic driving means) for driving such optical element are respectively disposed before and behind the armatures 4U and 4D in the direction of the optical axis. The incident position of the light beam on the image pickup surface can be vertically shifted up or down by controlling the driving states of the respective electromagnets 5Ua, 5Ub, 5Da and 5Db to control the state of inclination of the parallel-plane plate 3 and rotate the parallel-plane plate 3 in either of the directions indicated by a double-headed arrow V.

The electromagnet 5Ua is composed of a yoke 51U and a coil 53U, and the electromagnet 5Ub is composed of a yoke 52U and a coil 54U. The electromagnets 5Ua and 5Ub constitute (electromagnetic) driving means for moving the armature 4U back and forth in accordance with the control of supply of electricity to the respective coils 53U and 54U of the electromagnets 5Ua and 5Ub.

The electromagnet 5Da is composed of a yoke 51D and a coil 53D, and the electromagnet 5Db is composed of a yoke 52D and a coil 54D. The electromagnets 5Da and 5Db constitute (electromagnetic) driving means for moving the armature 4D back and forth in accordance with the control of supply of electricity to the respective coils 53D and 54D of the electromagnets 5Da and 5Db.

If the inclination angle of the parallel-plane plate 3 is varied by moving the top and bottom portions of the parallel-plane plate 3 back and forth in the direction of the optical axis by on-off control of the electromagnets 5Ua and 5Ub; 5Da and 5Db, the incident position of the light beam, which has passed through the parallel-plane plate 3, on the image pickup surface of the image pickup element 2 can be shifted vertically (up or down) with respect to the direction of the optical axis.

A parallel-plane plate glass 6 (hereinafter referred to as the parallel-plane plate 6) is provided for horizontally shifting a light beam passing through the image pickup lens unit 1 on the image pickup surface. Armatures 7L and 7R of electromagnetic soft iron, each of which constitutes an engagement part, are respectively disposed at the opposite ends of the parallel-plane plate 6, and electromagnets 8La and 8Lb; 8Ra and 8Rb are respectively disposed before and behind the armatures 7L and 7R in the direction of the optical axis. The incident position of the light beam on the image pickup surface can be horizontally shifted toward the right or the left by controlling the driving states of the respective electromagnets 8La, 8Lb, 8Ra and 8Rb to control the state of inclination of the parallel-plane plate 6 and rotate the parallel-plane plate 6 in either of the directions indicated by a double-headed arrow H.

The electromagnet 8La is composed of a yoke 81L and a coil 83L, and the electromagnet 8Lb is composed of a yoke 82L and a coil 84L. The electromagnets 8La and 8Lb constitute (electromagnetic) driving means for moving the armature 7L provided at the left end of the parallel-plane plate 6, back and forth in accordance with the control of supply of electricity to the respective coils 83L and 84L of the electromagnets 8La and 8Lb.

The electromagnet 8Ra is composed of a yoke 81R and a coil 83R, and the electromagnet 8Rb is composed of a yoke 82R and a coil 84R. The electromagnets 8Ra and 8Rb constitute (electromagnetic) driving means for moving the armature 7R provided at the right end of the parallel-plane plate 6, back and forth in accordance with the control of supply of electricity to the respective coils 83R and 84R of the electromagnets 8Ra and 8Rb.

If the inclination angle of the parallel-plane plate 6 is varied by moving the right and left portions of the parallel-plane plate 6 back and forth in the direction of the optical axis by on-off control of the electromagnets 8Ra and 8Rb; 8La and 8Lb, the incident position of the light beam, which has passed through the parallel-plane plate 6, on the image pickup surface of the image pickup element 2 can be shifted horizontally (toward the right or the left) with respect to the direction of the optical axis.

The two vertical and horizontal parallel-plane plates 3 and 6 are disposed in the space between the image pickup lens unit 1 and the image pickup element 2 in such a manner that the respective parallel-plane plates 3 and 6 are made to incline with respect to the vertical and horizontal directions, thereby shifting the position of incidence on the image pickup surface of the light beam which has passed through the image pickup lens unit 1, in the vertical and horizontal directions at a pitch smaller than the pixel-to-pixel distance of the image pickup element 2. Accordingly, the image pickup apparatus can pick up an image which is incident on the image pickup surface at a location between each pixel of the image pickup element 2, so that the image pickup apparatus is capable of realizing an image quality equivalent to that of an image picked up by an image pickup element, the number of pixels of which is greater than the actual number of pixels of the image pickup element 2.

The detailed arrangement and the operation of the pixel shifting system according to the first embodiment of the present invention will be described below with reference to FIGS. 2(a), 2(b) to 6.

FIGS. 2(a) and 2(b) show the arrangement of the parallel-plane plate 3 which performs vertical pixel shifting.

The pixel shifting system according to the first embodiment of the present invention is disposed between the image pickup lens unit 1 and the image pickup element 2. In practice, the pixel shifting system may be disposed, for example, in the lens unit of a camera or in the camera body thereof.

FIG. 2(a) shows the state of the parallel-plane plate 3 as viewed from the front side, i.e., in the direction of incidence of a light beam, while FIG. 2(b) shows the state of the parallel-plane plate 3 as viewed from the right side. As shown in FIG. 2(a), the parallel-plane plate 3 is positioned in front of the image pickup surface of the image pickup element 2, and has a size which covers the entire image pickup surface.

The top and bottom armatures 4U and 4D of the parallel-plane plate 3 are located in a frame portion of the lens unit or a frame portion of the camera body.

As shown in FIG. 2(b), the parallel-plane plate 3 is held in the state in which the armatures 4U and 4D of electromagnetic soft iron provided at the opposite ends of the parallel-plane plate 3 are respectively movably fitted in recesses 91U and 91D formed in the frame portion, i.e., in the state of having predetermined clearances in the forward and rearward directions and in the upward and downward directions.

Each of the recesses 91U and 91D is extended by a length approximately equal to the width of the parallel-plane plate 3 in a direction perpendicular to the surface of the sheet of FIG. 2(b), and the armatures 4U and 4D of electromagnetic soft iron provided at the opposite ends of the parallel-plane plate 3 are formed into cylindrical shapes which respectively extend along inner surfaces 92U and 93U of the recess 91U and inner surfaces 92D and 93D of the recess 91D. Accordingly, the armatures 4U and 4D can come into line contact with restriction surfaces in the respective recesses 91U and 91D so that the inclination of the parallel-plane plate 3 with respect to the rolling direction can be restricted. As another method for obtaining the same effect as the line contact due to the cylindrical shape, a plurality of point contact portions may be formed on the line of the line contact.

These recesses function as restriction portions for positioning the optical element of the present invention, and the surfaces which come into abutment with the armatures which constitute the engagement parts of the parallel-plane plate serving as the optical element function as position restricting surfaces or position restricting portions for positioning.

By bringing the armature 4U into abutment with either of the inner surfaces 92U and 93U which are respectively arranged in the recess 91U along the optical axis, i.e., located on the left and right sides as viewed in FIG. 2(b), and by bringing the armature 4D into abutment with either of the inner surfaces 92D and 93D which are respectively arranged in the recess 91D along the optical axis, i.e., located on the left and right sides as viewed in FIG. 2(b), the inclination position of the parallel-plane plate 3 with respect to the optical axis and the position of the parallel-plane plate 3 in the direction of the optical axis are determined, and the respective amounts of movements along the optical axis of the armatures 4U and 4D provided at the opposite ends of the parallel-plane plate 3 are determined according to the respective widths of the recesses 91U and 91D which are taken in the direction of the optical axis. In consequence, the parallel-plane plate 3 is controlled so that the amount of inclination of the parallel-plane plate 3 or the position thereof in the direction of the optical axis is made different.

The present pixel shifting system also includes the parallel-plane plate 6 which is a horizontal parallel-plane plate having an arrangement similar to the above-described arrangement. The positional relation between the parallel-plane plate 3 and the parallel-plane plate 6 is shown in FIGS. 3(a) and 3(b).

Figure 3A:
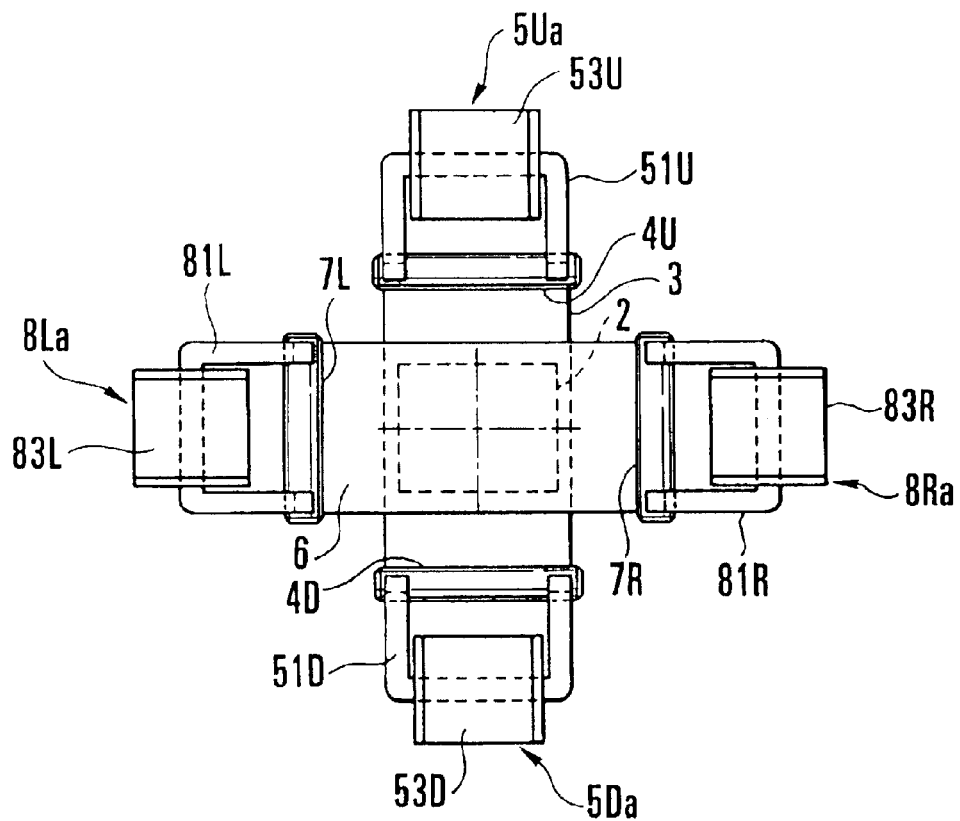
FIGS. 3(a) and 3(b) are diagrammatic views aiding in explaining the arrangement and the operation principle of the pixel shifting system according to the first embodiment of the present invention.
Figure 3B:
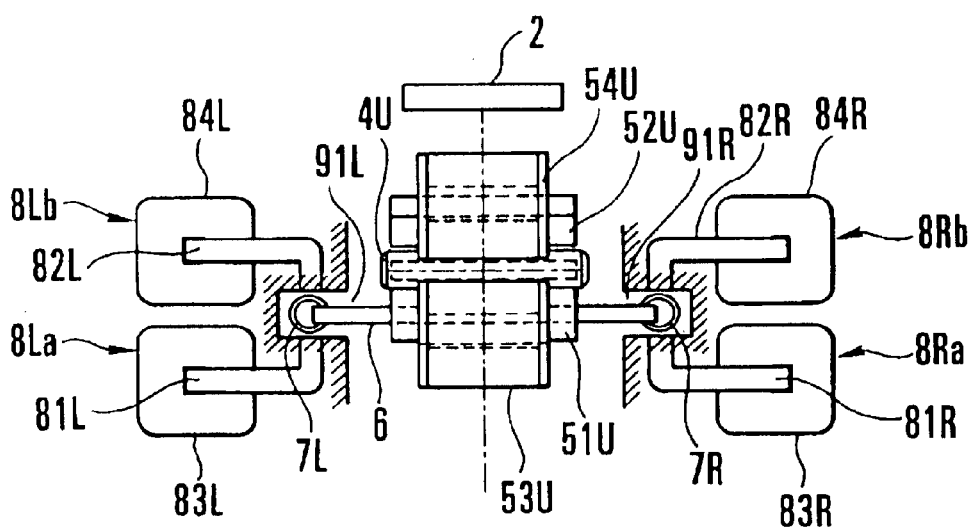

FIG. 3(a) is a front elevational view taken in the direction of the optical axis, and FIG. 3(b) is a top plan view. As can also be seen from FIG. 1(a), the horizontal parallel-plane plate 6 and the vertical parallel-plane plate 3 are disposed in a perpendicular relation to each other between the image pickup lens unit 1 and the image pickup element 2.

The main feature of the pixel shifting system according to the first embodiment of the present invention resides in the arrangement in which a multiplicity of inclination positions of each of the parallel-plane plates can be obtained by restricting the inclination position of each of the parallel-plane plates and the position of each of the parallel-plane plates in the direction of the optical axis by means of the armatures provided at the opposite ends and the position restricting surfaces in the corresponding recesses, and in which the electromagnets are used as driving sources for the armatures and each of the parallel-plane plates is disposed in such a manner that the armatures at the opposite end are movably fitted in the corresponding recesses with predetermined clearances. In operation, the position of each of the parallel-plane plates is restricted by the electromagnetic forces of the electromagnets, and even if the electromagnets are not excited, no special supporting arrangement is needed as means for supporting the parallel-plane plates. With such a supporting arrangement, unlike a conventional system, it is possible to omit a gimbal mechanism having vertical and horizontal rotating shafts, a complicated cam mechanism, a gear mechanism, a plurality of stepping motors or the like.

Since each of the parallel-plane plates 3 and 6 is supported in such a manner that the opposite armatures are movably fitted in the corresponding recesses, there is no need for a special supporting mechanism such as a gimbal. In addition, since electromagnetic forces are directly applied to the respective armatures as driving forces, there is no need for a mechanism for transmitting the driving forces, so that not only can the arrangements of the parallel-plane plates 3 and 6 be made simple but also the parallel-plane plates 3 and 6 can be driven at extremely high speeds and their positions can be restricted with high accuracy.

The arrangement of the pixel shifting system according to the first embodiment of the present invention and the details of the control of the parallel-plane plates will be described below with reference to FIGS. 4 to 7.

FIGS. 4 to 7 are views aiding in explaining the control of the inclination position of the parallel-plane plate 3 which performs vertical pixel shifting. The main feature of the arrangement of the first embodiment resides in the relative positional relation between the recesses 91U and 91D and the setting of the width of each of the recesses 91U and 91D.

FIGS. 4 to 7 respectively show different inclination positions of the parallel-plane plate 3 for sequentially shifting down the incident position of a light beam which corresponds to one point on a subject, on the image pickup surface of the image pickup element 2.

Figure 4:
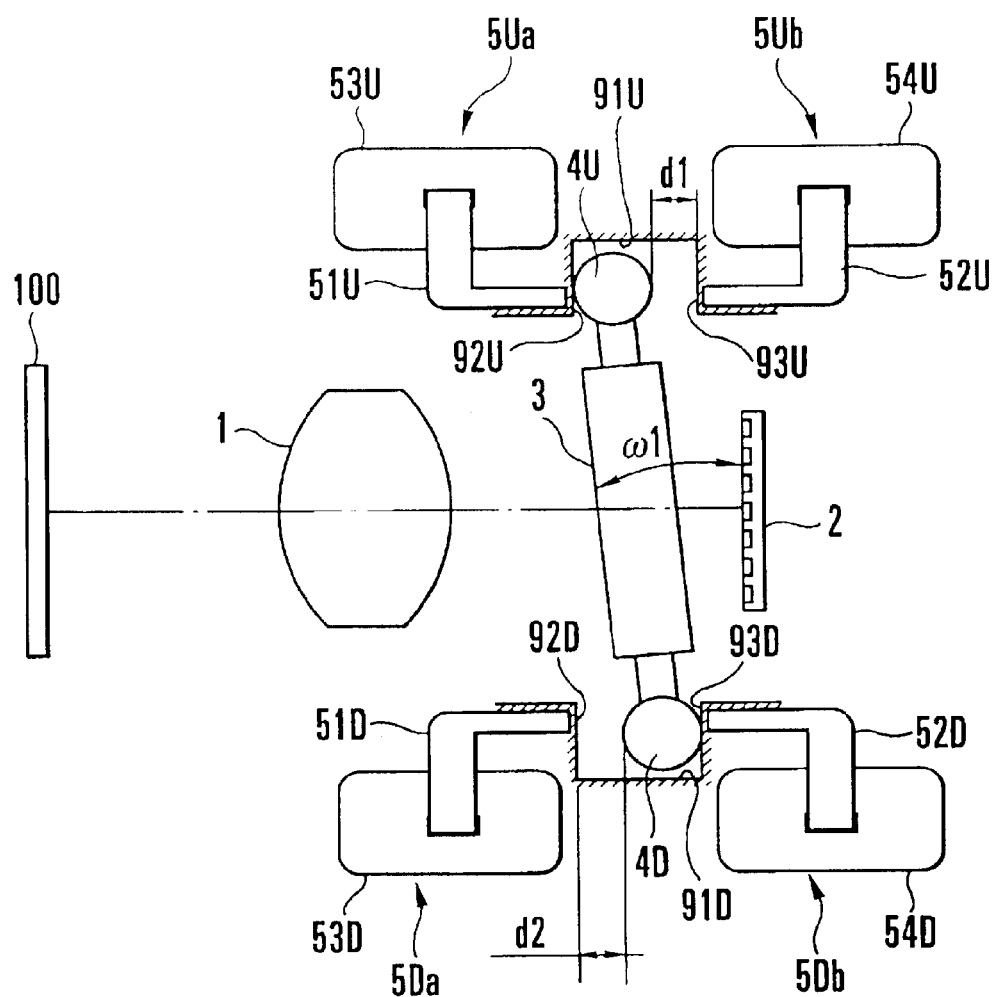
FIG. 4 is a diagrammatic view aiding in explaining the vertical pixel shifting operation of the pixel shifting system according to the first embodiment of the present invention.

Referring to FIG. 4, the dimensions of the recess 91u in which the armature 4U provided at the top end of the parallel-plane plate 3 is movably fitted and those of the recess 91D in which the armature 4D provided at the bottom end of the parallel-plane plate 3 is movably fitted are set in such a manner that the widths of the recesses 91U and 91D, i.e., the lengths of the recesses 91U and 91D in the direction of the optical axis, are approximately equal to each other, and the positions of the recesses 91U and 91D are approximately the same as each other.

Referring to the upper portion of FIG. 4, the electromagnet 5Ua is on and electromagnet 5Ub is off, so that, in the recess 91U, the armature 4U is attracted to the yoke 51U of the electromagnet 5Ua and positioned by abutment with the position restricting surface 92U which is located before the armature 4U in the direction of the optical axis. Referring to the lower portion of FIG. 4, the electromagnet 5Da is off and the electromagnet 5Db is on, so that the armature 4D is attracted to the yoke 52D of the electromagnet 5Db and positioned by abutment with the position restricting surface 93D which is located behind the armature 4D in the direction of the optical axis.

In the first embodiment, when the pixel shifting system is in the state shown in FIG. 4, the parallel-plane plate 3 is set to perform upward pixel shifting with respect to the optical axis, but none of the states of inclination shown in FIGS. 4, 5, 6 and 7 is absolute. The present pixel shifting system is intended to allow an image which originally cannot be incident on the image pickup surface to be made incident thereon according to the inclination angle of the parallel-plane plate 3, and the parallel-plane plate 3 need not be perpendicular to the optical axis in any of the states shown in FIGS. 4, 5, 6 and 7.

Letting d1 be the clearance between the armature 4U and the width of the recess 91U, i.e., the distance between the armature 4U and the position restricting surface 93U in the recess 91U, and letting d2 be the clearance between the armature 4D and the width of the recess 91D, i.e., the distance between the armature 4D and the position restricting surface 92D in the recess 91D, the relation between d1 and d2 is set to d2=d1, i.e., the distance d2 is once as large as, i.e., equal to, the distance d1.

In FIG. 4, ω1 denotes the angle made by the parallel-plane plate 3 and the image pickup surface of the image pickup element 2. Incidentally, the distances d1 and d2 are set with high precision.

In the state shown in FIG. 4, if the electromagnet 5Ua is turned off and the electromagnet 5Ub is turned on and excited, the armature 4U provided at the top end of the parallel-plane plate 3 moves away from the position restricting surface 92U in the recess 91U and is attracted to the position restricting surface 93U and positioned by abutment with the position restricting surface 93U. Thus, the parallel-plane plate 3 goes to the state shown in FIG. 5.

Figure 5:
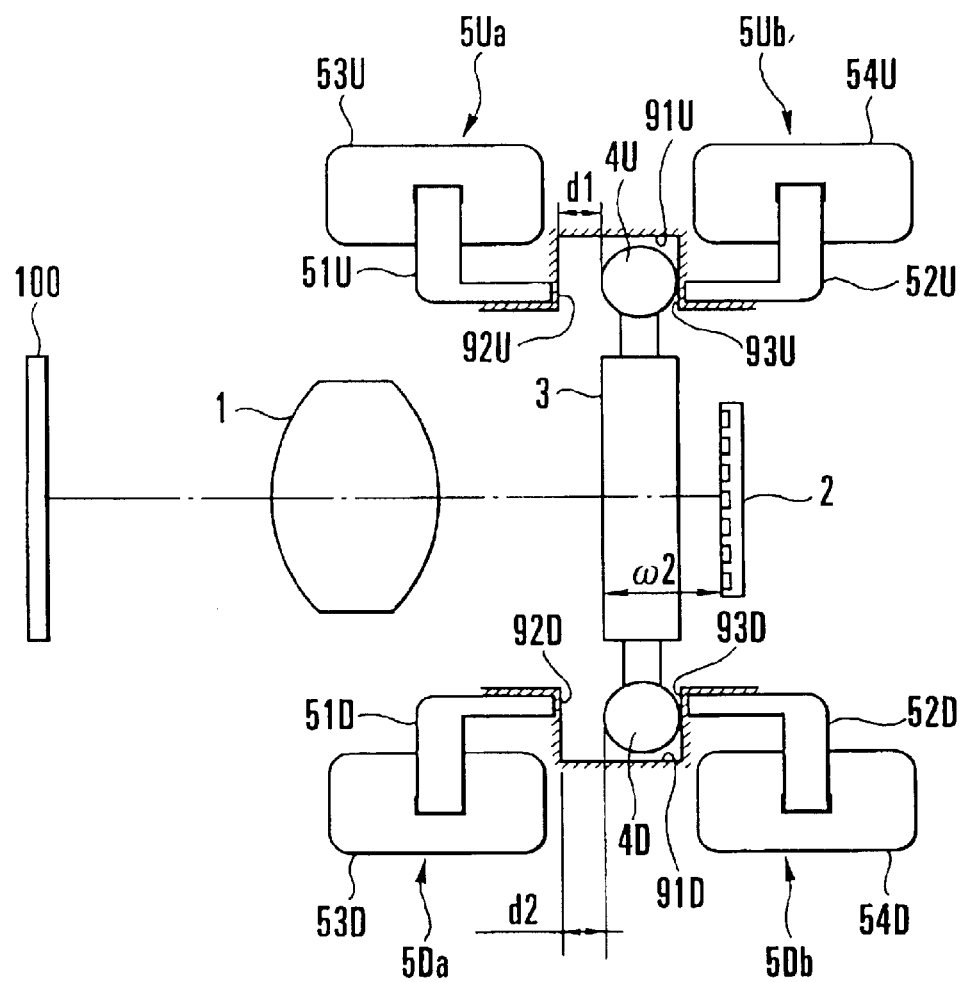
FIG. 5 is a diagrammatic view aiding in explaining the vertical pixel shifting operation of the pixel shifting system according to the first embodiment of the present invention.

In the state shown in FIG. 5, the inclination position of the parallel-plane plate 3 is restricted by the abutment between the armature 4U provided at the top end of the parallel-plane plate 3 and the position restricting surface 93U in the recess 91U and by the abutment between the armature 4D provided at the bottom end of the parallel-plane plate 3 and the position restricting surface 93D in the recess 91D. Specifically, the parallel-plane plate 3 is inclined from the state of FIG. 4 toward the right by one step as viewed in FIG. 4, and the incident position of the light beam on the image pickup surface of the image pickup element 2 is shifted downward on the image pickup surface. Incidentally, ω2 denotes the angle made by the image pickup surface and the parallel-plane plate 3 in the state shown in FIG. 5.

In the state shown in FIG. 5, if the electromagnet 5Ub is turned off and the electromagnet 5Ua is turned on, the armature 4U moves away from the position restricting surface 93U in the recess 91U and is attracted to the position restricting surface 92U and positioned by abutment with the position restricting surface 92U.

In addition, if the electromagnet 5Db is turned off and the electromagnet 5Da is turned on, the armature 4D provided at the bottom end of the parallel-plane plate 3 moves away from the position restricting surface 93D in the recess 91D and is attracted to the position restricting surface 92D and positioned by abutment with the position restricting surface 92D. Thus, the parallel-plane plate 3 goes to the state shown in FIG. 6.

Figure 6:
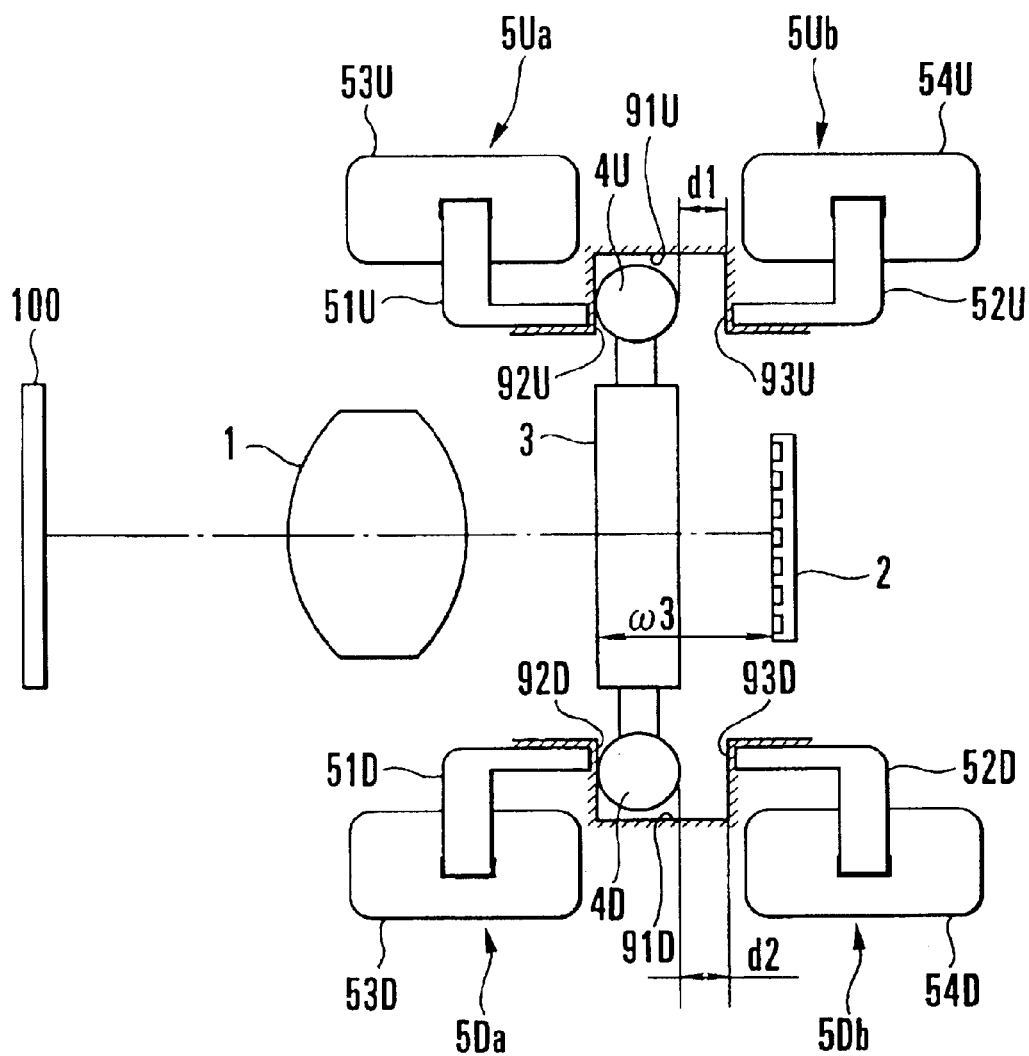
FIG. 6 is a diagrammatic view aiding in explaining the vertical pixel shifting operation of the pixel shifting system according to the first embodiment of the present invention.

In the state shown in FIG. 6, the inclination position of the parallel-plane plate 3 is restricted by the abutment between the armature 4U provided at the top end of the parallel-plane plate 3 and the position restricting surface 92U in the recess 91U and by the abutment between the armature 4D provided at the bottom end of the parallel-plane plate 3 and the position restricting surface 92D in the recess 91D. Specifically, the position of the parallel-plane plate 3 in the direction of the optical axis is moved from the state of FIG. 5 toward the left with approximately the same inclination being maintained. (Strictly, the inclination differs between the states shown in FIGS. 5 and 6 because the parallel-plane plate 3 in the state of FIG. 5 and the parallel-plane plate 3 in the state of FIG. 6 are in abutment with different position restricting surfaces.) The incident position of the light beam on the image pickup surface of the image pickup element 2 is approximately the same on the image pickup surface. Incidentally, ω3 denotes the angle made by the image pickup surface and the parallel-plane plate 3 in the state shown in FIG. 6. Thus, ω2≅ω3 and the angle made by the parallel-plane plate 3 and the optical axis in the state shown in FIG. 5 is the same as the corresponding angle obtained in the state shown in FIG. 6. Accordingly, the pixel shifting effects obtained in both states are the same, and either one of the states may be selected.

In the following description of the first embodiment, the state shown in FIG. 5 is selected.

In the state shown in FIG. 5, if the electromagnet 5Db is turned off and the electromagnet 5Da is turned on, the armature 4D provided at the bottom end of the parallel-plane plate 3 moves away from the position restricting surface 93D in the recess 91D and is attracted to the position restricting surface 92D and positioned by abutment with the position restricting surface 92D. Thus, the parallel-plane plate 3 goes to the state shown in FIG. 7.

Figure 7:
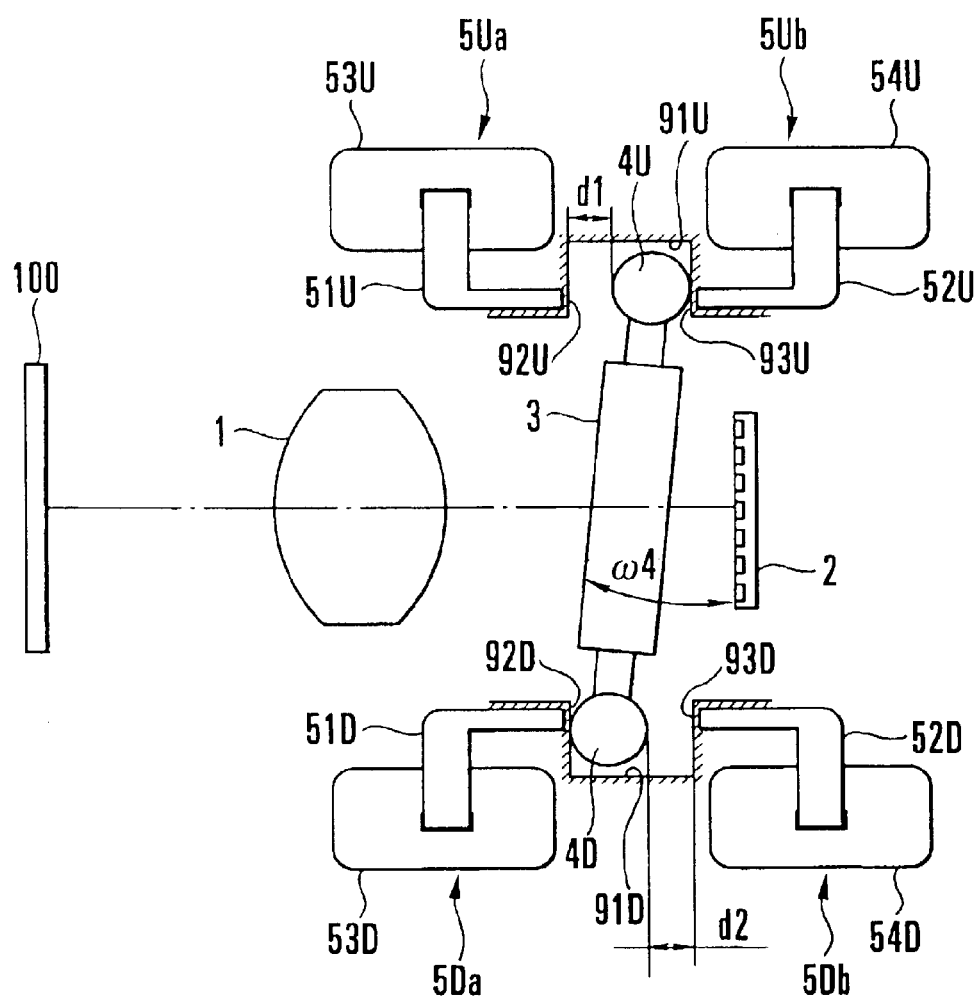
FIG. 7 is a diagrammatic view aiding in explaining the vertical pixel shifting operation of the pixel shifting system according to the first embodiment of the present invention; A
Figure 8:
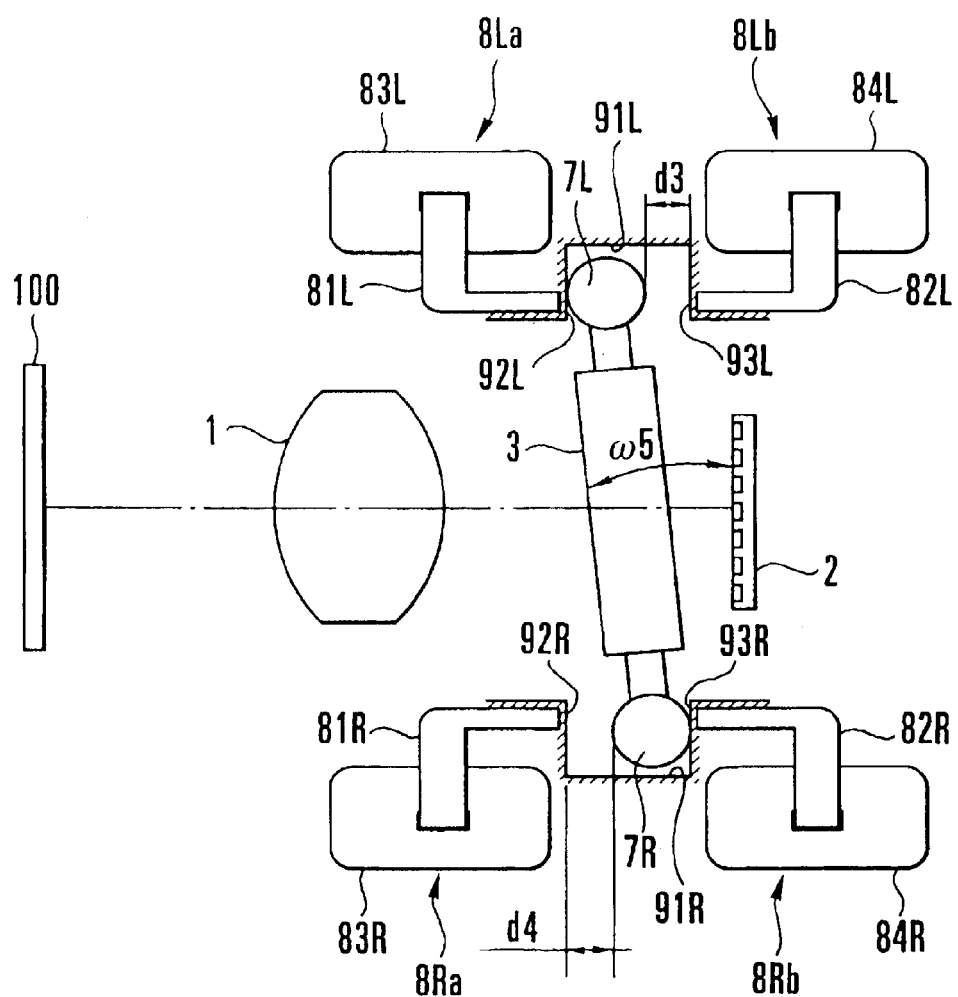
FIG. 8 is a diagrammatic view aiding in explaining the horizontal pixel shifting operation of the pixel shifting system according to the first embodiment of the present invention.
Figure 9:
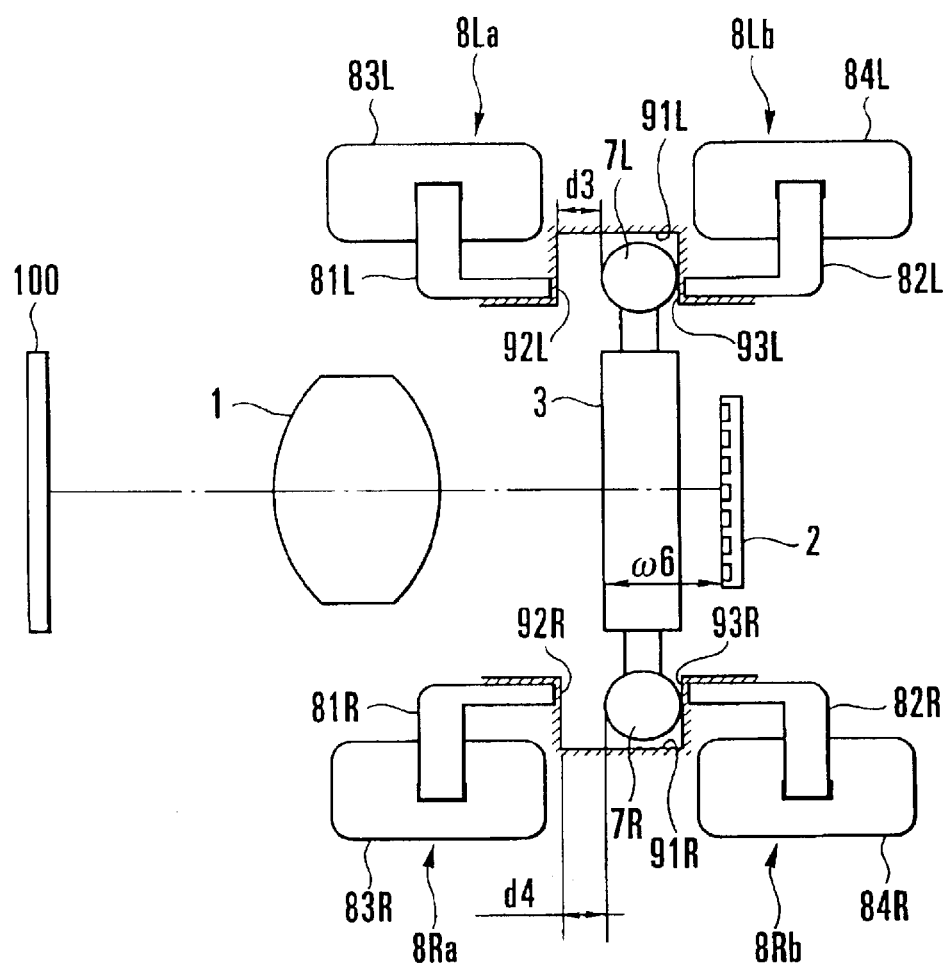
FIG. 9 is a diagrammatic view aiding in explaining the horizontal pixel shifting operation of the pixel shifting system according to the first embodiment of the present invention.
Figure 10:
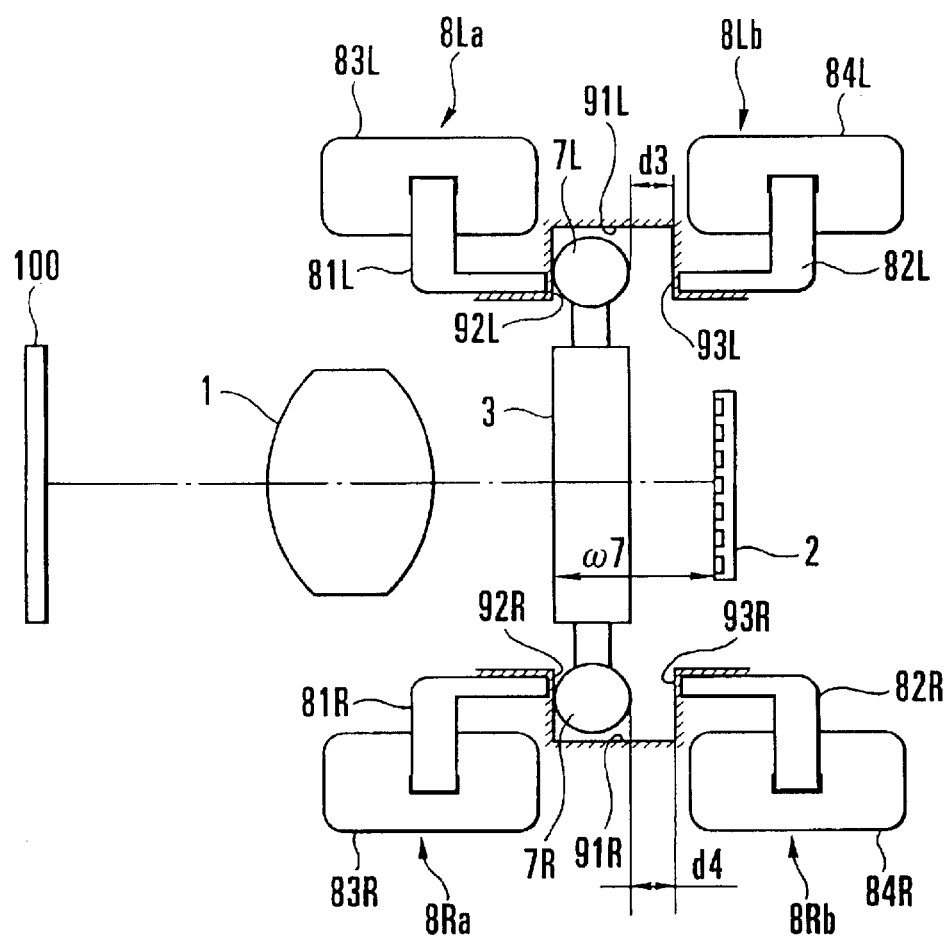
FIG. 10 is a diagrammatic view aiding in explaining the horizontal pixel shifting operation of the pixel shifting system according to the first embodiment of the present invention.
Figure 11:
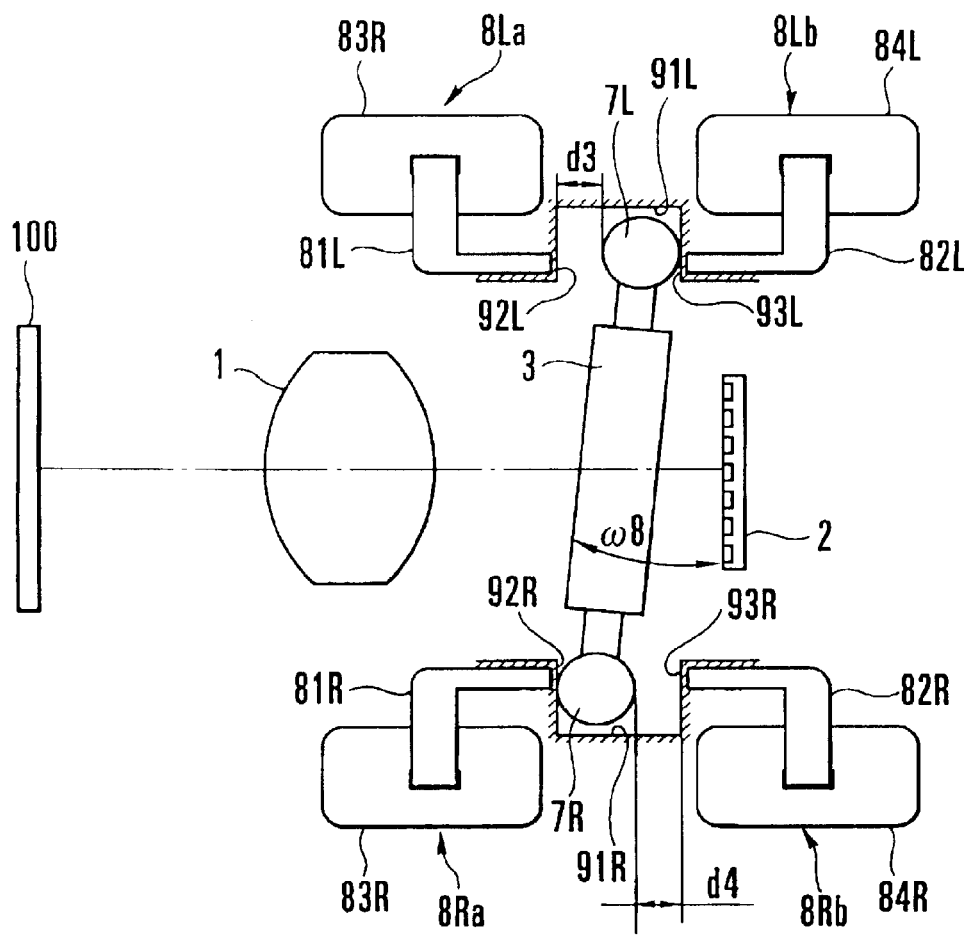
FIG. 11 is a diagrammatic view aiding in explaining the horizontal pixel shifting operation of the pixel shifting system according to the first embodiment of the present invention.

In the state shown in FIG. 7, the parallel-plane plate 3 is inclined from the state of FIG. 5 toward the right as viewed in FIG. 7, and the inclination angle of the parallel-plane plate 3 reaches a maximum. Incidentally, ω4 denotes the angle made by the image pickup surface and the parallel-plane plate 3 in the state shown in FIG. 7.

As is apparent from FIGS. 4 to 7, by sequentially varying the inclination of the parallel-plane plate 3 in the order of ω1, ω2, ω3 and ω4, it is possible to control the parallel-plane plate 3 to vary its inclination angle in three steps. Thus, the incident position of the light beam coming from the subject can be vertically shifted among three positions on the image pickup surface.

Incidentally, the angles ω1 to ω4 are selected to satisfy the following relation:

(ω2−ω1)=(ω4−ω2)=(ω4−ω3)=constant, and this relation indicates that the incident position of the light beam on the image pickup surface is shifted at an equal pitch on the image pickup surface according to the variation in the inclination of the parallel-plane plate 3.

In the first embodiment, the clearance d1 between the armature 4U and the position restricting surface 92U or 93U in the recess 91U and the clearance d2 between the armature 4D and the position restricting surface 92D or 93D in the recess 91D are set so that the amount of shifting for one step becomes equal to two-thirds of the pixel-to-pixel distance of the image pickup element. The clearances d1 and d2, which determine the inclination angle of the parallel-plane plate 3, are varied according to the pixel-to-pixel distance of the image pickup element or the amount of shifting for one step.

As is apparent from the above description, the parallel-plane plate 3 is supported with some play in such a manner that the opposite armatures 4U and 4D are movably fitted in the respective recesses 91U and 91D, and the inclination angle of the parallel-plane plate 3 is determined by bringing each of the armatures 4U and 4D into abutment with either of the position restricting surfaces in the corresponding one of the recesses 91U and 91D by the excitation of the associated one of the electromagnets. Since each of the armatures which comes into abutment with either of the corresponding position restricting surfaces has a cylindrical shape, even if the position of abutment of each of the cylindrical armatures with either of the corresponding position restricting surfaces deviates in a longitudinal direction of the parallel-plane plate 3, the inclination angle of the parallel-plane plate 3 does not vary, so that the incident position of the light beam on the image pickup surface of the image pickup element does not vary.

Furthermore, if the positions of the respective recesses 91U and 91D are made the same in the direction of the optical axis, even if the inclination angle of the parallel-plane plate 3 varies, the central position of the parallel-plane plate 3 in the direction of the optical axis does not vary to a great extent, so that accurate pixel shifting can be effected at all times.

Incidentally, since each of the armatures has a cylindrical shape, when the armature is attracted by the electromagnetic force of the corresponding electromagnet, the portion of the armature which comes into closest proximity to either of the corresponding position restricting surfaces forms a point (actually, a line). Accordingly, the parallel-plane plate 3 is centered by the position of the armature of the electromagnet, and substantially does not suffer a positional deviation.

The respective mounting positions of the yokes 51U, 52U, 51D and 52D of the electromagnets 5Ua, 5Ub, 5Da and 5Db are set so that the respective tips of the yokes 51U, 52U, 51D and 52D do not project from the position restricting surfaces 92U, 93U, 92D and 93D in the recesses 91U and 91D. Thus, the parallel-plane plate 3 is positioned by the position restricting surfaces in each of the recesses at all times, so that the parallel-plane plate 3 can be positioned with high accuracy without being affected by the accuracy of the mounting positions of the electromagnets.

In the above-described arrangement, the inclination of the parallel-plane plate 3 is set so that the incident position of the light beam on the image pickup surface is shifted at a pitch of two-thirds of the pixel-to-pixel distance of the image pickup surface, i.e., at a two-third pixel pitch for each inclination angle. Accordingly, it is possible to obtain the number of pixels which is substantially three times the number of vertical pixels of an actual image pickup element.

Thus, three images are picked up by the image pickup element for the respective inclination positions of the parallel-plane plate 3, and the picked-up three images are sequentially stored in a memory. During reading from the memory, the order of reading of each pixel of the three images is controlled so that the three images can be combined into one image of high image quality.

The above description has referred to the vertical pixel shifting on the image pickup surface. However, since the first embodiment of the present invention is also provided with a similar pixel shifting mechanism which performs horizontal pixel shifting, the first embodiment is capable of performing horizontal pixel shifting so that the number of pixels of the image pickup element can be made substantially three times, i.e., nine times in total.

FIGS. 8 to 11 are views aiding in explaining the operation of performing horizontal pixel shifting by sequentially varying the inclination angle of the horizontal parallel-plane plate 6.

Since the arrangement and the operation principle of the horizontal pixel shifting mechanism are the same as those of the vertical pixel shifting mechanism shown in FIGS. 4 to 7, the detailed description of the horizontal pixel shifting mechanism is omitted herein.

Incidentally, the inclination angle of the parallel-plane plate 6 is determined by position restricting surfaces 92L and 93L of a left recess 91L in which the armature 7L mounted at the left end of the parallel-plane plate 6 is movably fitted and position restricting surfaces 92R and 93R of a right recess 91R in which the armature 7R mounted at the right end of the parallel-plane plate 6 is movably fitted. Letting d3 be the clearance between the armature 7L and the width of the recess 91L, and letting d4 be the clearance between the armature 7R and the width of the recess 91R, the relation between d3 and d4 is set to d3=d4 in the first embodiment.

In the above-described arrangement, if the angle made by the image pickup surface and the parallel-plane plate 6 is stepwise varied (increased) in the order of $\omega 5$, $\omega 6$, $\omega 7$ and $\omega 8$ while the inclination angle of the parallel-plane plate 6 is being increased in the order of FIGS. 8, 9, 10 and 11, horizontal pixel shifting at an equal pitch can also be performed on the image pickup surface.

Incidentally, the angles $\omega 5$ to $\omega 8$ are selected to satisfy the following relation:

$$(\omega 6 - \omega 5) = (\omega 8 - \omega 6) = (\omega 8 - \omega 7) = \text{constant}.$$

In the first embodiment, the clearance d3 between the armature 7L and the position restricting surface 92L or 93L in the recess 91L and the clearance D4 between the armature 7R and the position restricting surface 92R or 93R in the recess 91R are set so that the amount of shifting for one step becomes equal to two-thirds of the horizontal pixel-to-pixel distance of the image pickup element. The clearances d3 and d4, which determine the inclination angle of the parallel-plane plate 6, are varied according to the pixel-to-pixel distance of the image pickup element or the amount of shifting for one step.

Incidentally, although the vertical pixel shifting shown in FIGS. 4 to 7 and the horizontal pixel shifting shown in FIGS. 8 to 11 are performed so as to sequentially increase the respective inclination angles of the parallel-plane plates 3 and 6, images are picked up for the respective inclination positions and stored in the memory so that the images can be combined into one image by processing to be performed at a later time. For this reason, the respective inclination angles of the parallel-plane plates 3 and 6 may be varied in arbitrary order. In other words, the vertical pixel shifting and the horizontal pixel shifting need not be limited to the order shown in FIGS. 4 to 7 and the order shown in FIGS. 8 to 11, and may be performed in arbitrary order as long as three images in the vertical direction and three images in the horizontal image, a total of nine images, can be picked up by controlling each of the electromagnets.

Furthermore, since the vertical pixel shifting mechanism and the horizontal pixel shifting mechanism are independent of each other, the direction and the order of pixel shifting by each of the vertical and horizontal pixel shifting mechanisms may be arbitrary. As a matter of course, each of the parallel plates must be kept stationary during an image pickup (charge storage) operation for each pixel shifting position.

Figure 12A:
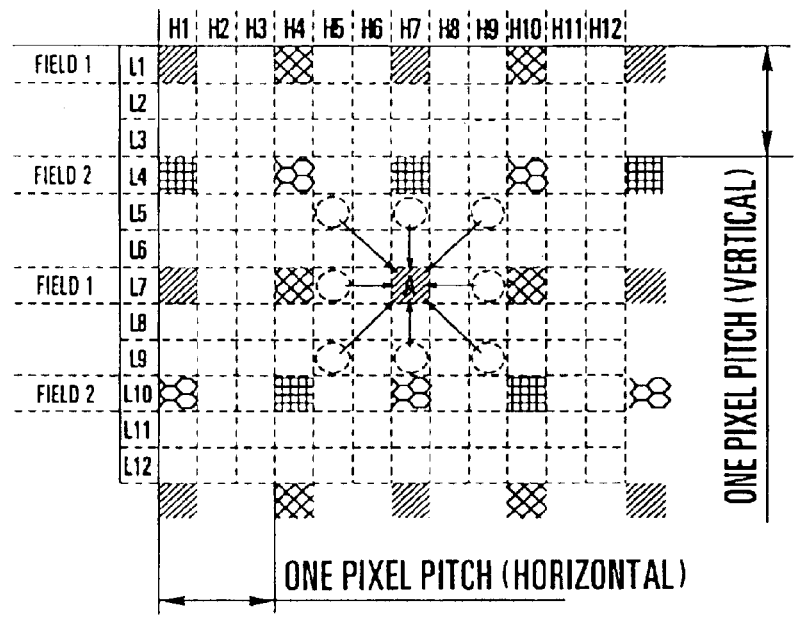
FIGS. 12(a) and 12(b) are views aiding in explaining the combined pixel shifting operation of the pixel shifting system,according to the first embodiment of the present invention.
Figure 12B:
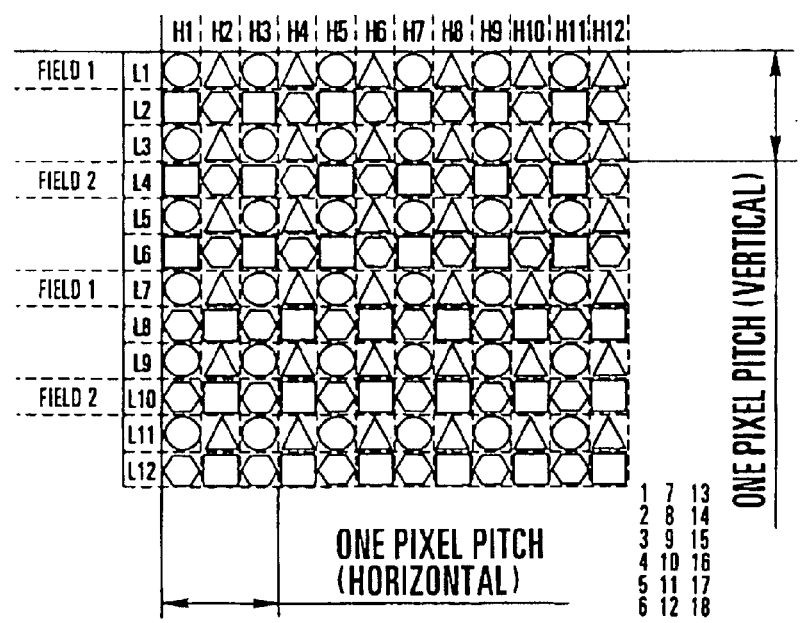

FIGS. 12(*a*) and 12(*b*) are diagrammatic views showing the spatial positions of the pixels obtained when pixel shifting is performed on the basis of a combination of the three states, shown in FIGS. 4 to 7, of the parallel-plane plate 3 for vertical pixel shifting and the three states, shown in FIGS. 8 to 11, of the parallel-plane plate 6 for horizontal pixel shifting.

A method of shifting a light beam to obtain data will be described below with reference to FIGS. 12(*a*) and 12(*b*).

In FIG. 12(*a*), the locations shaded by hatching (four kinds of hatching such as cross-hatching) show part of the positions of pixels (photosensitive portions) on an image pickup element such as an interline transfer type CCD. As shown in FIG. 12(*a*), the portion (non-photosensitive portion) between each of the pixels and the neighboring pixel is divided into two parts to divide one pixel pitch by three so that the image pickup surface of the image pickup element is divided in a checkered pattern.

As shown in FIG. 12(*a*), for example, the photosensitive portion denoted by symbol A can capture light beams incident on nine locations which are respectively defined by nine coordinates (H5, L5), (H5, L7), (H5, L9), (H7, L5), (H7, L7), (H7, L9), (H9, L5), (H9, L7) and (H9, L9), on the basis of the combination of the three states, shown in FIGS. 4 to 7, of the parallel-plane plate 3 for vertical pixel shifting and the three states, shown in FIGS. 8 to 11, of the parallel-plane plate 6 for horizontal pixel shifting. The light beams incident on the respective nine locations are conducted to the photosensitive portion A on a beam-by-beam basis (by pixel shifting), and the stored data (the charge stored in the photosensitive portion A) is read during reading of field data from the photosensitive portion A. A similar operation is performed during reading of field data from each of the other photosensitive portions.

In consequence, as shown in FIG. 12(*b*), it is possible to obtain, by pixel shifting, data indicative of light beams which are incident on the non-photosensitive portion which surrounds each photosensitive portion.

In other words, it is possible to obtain image information carried by a light beam which would originally be incident on the non-photosensitive portion between each pixel on the image pickup surface or on a pixel other than a predetermined pixel. In consequence, it is possible to achieve an effect equivalent to an increase in the number of pixels per image pickup element.

As described above, in the arrangement and the operation of the pixel shifting system according to the first embodiment of the present invention, two parallel-plane plates which respectively perform vertical pixel shifting and horizontal pixel shifting are disposed independently of each other, and during an image pickup operation, the inclination angles of the parallel-plane plates are shifted, one in the vertical direction and the other in the horizontal direction, at a pitch of two-thirds of the pixel-to-pixel distance of the image pickup surface. In this manner, it is possible to obtain an image quality equivalent to the number of pixels which is substantially three times the actual number of pixels with respect to each of the vertical and horizontal directions, i.e., a total of nine times the actual number of pixels.

Second Embodiment

A second embodiment of the present invention will be described below. Although the first embodiment shown in FIGS. 4 to 11 is arranged to perform pixel shifting of three steps in each of the vertical and horizontal directions, the second embodiment is capable of performing pixel shifting of four steps in each of the vertical and horizontal directions.

In the second embodiment, parallel-plane plates, recesses for positioning the parallel-plane plates, and electromagnets which constitute driving means are arranged in a manner similar to that described previously in connection with the first embodiment, and the feature of the second embodiment can be realized by modifying the positional relation between the recesses.

FIGS. 13 to 16 are views aiding in explaining the control of the inclination position of the parallel-plane plate 3 which performs vertical pixel shifting of four steps. The main feature of the arrangement of the second embodiment resides in the relative positional relation between recesses 91U' and 91D' and the setting of the width of each of the recesses 91U' and 91D'.

FIGS. 13 to 16 respectively show different inclination positions of the parallel-plane plate 3 for sequentially shifting down the incident position of a light beam which corresponds to one point on a subject, on the image pickup surface of the image pickup element 2. In the following description, identical reference numerals are used to denote constituent parts identical to those of the first embodiment shown in FIGS. 4 to 11.

Figure 13:
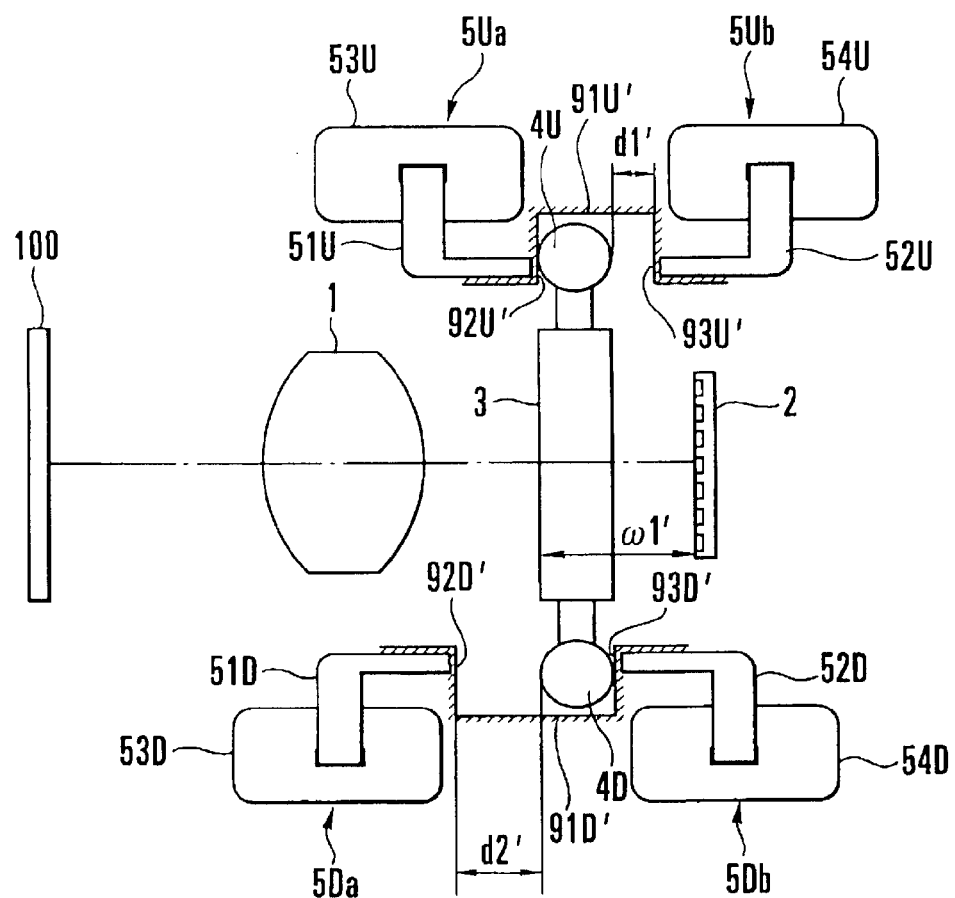
FIG. 13 is a diagrammatic view aiding in explaining the vertical pixel shifting operation of a pixel shifting system according to a second embodiment of the present invention.

Referring to FIG. 13, the dimensions of the recess 91U' in which the armature 4U provided at the top end of the parallel-plane plate 3 is movably fitted and those of the recess 91D' in which the armature 4D provided at the bottom end of the parallel-plane plate 3 is movably fitted are set in such a manner that the widths of the recesses 91U' and 91D', i.e., the lengths of the recesses 91U' and 91D' in the direction of the optical axis, are different from each other, and the positions of the recesses 91U and 91D are different from each other.

Referring to the upper portion of FIG. 13, the electromagnet 55Ua is on and electromagnet 5Ub is off, so that, in the recess 91U', the armature 4U is attracted to the yoke 51U of the electromagnet 5Ua and positioned by abutment with a position restricting surface 92U' which is located before the armature 4U in the direction of the optical axis. Referring to the lower portion of FIG. 13, the electromagnet 5Da is off and the electromagnet 5Db is on, so that the armature 4D is attracted to the yoke 52D of the electromagnet 5Db and positioned by abutment with a position restricting surface 93D' which is located behind the armature 4D in the direction of the optical axis.

In the second embodiment, when the pixel shifting system is in the state shown in FIG. 13, the parallel-plane plate 3 is set to have a perpendicular positional relation to the optical axis, but none of the states of inclination shown in FIGS. 13, 14, 15 and 16 is absolute. The present pixel shifting system is intended to allow an image which originally cannot be incident on the image pickup surface to be made incident thereon according to the inclination angle of the parallel-plane plate 3, and the parallel-plane plate 3 need not be perpendicular to the optical axis in any of the state shown in FIG. 13.

Letting d1' be the clearance between the armature 4U and the width of the recess 91U', i.e., the distance between the armature 4U and the position restricting surface 93U' in the recess 91U', and letting d2' be the clearance between the armature 4D and the width of the recess 91D', i.e., the distance between the armature 4D and the position restricting surface 92D' in the recess 91D', the relation between d1' and d2' is set to d2'=d1', i.e., the distance d2' is twice as large as the distance d1'.

In FIG. 13, ω1' denotes the angle made by the parallel-plane plate 3 and the image pickup surface of the image pickup element 2. Incidentally, the distances d1' and d2' are set with high precision.

In the state shown in FIG. 13, if the electromagnet 5Ua is turned off and the electromagnet 5Ub is turned on and excited, the armature 4U provided at the top end of the parallel-plane plate 3 moves away from the position restricting surface 92U' in the recess 91U' and is attracted to the position restricting surface 93U' and positioned by abutment with the position restricting surface 93U'. Thus, the parallel-plane plate 3 goes to the state shown in FIG. 14.

Figure 14:
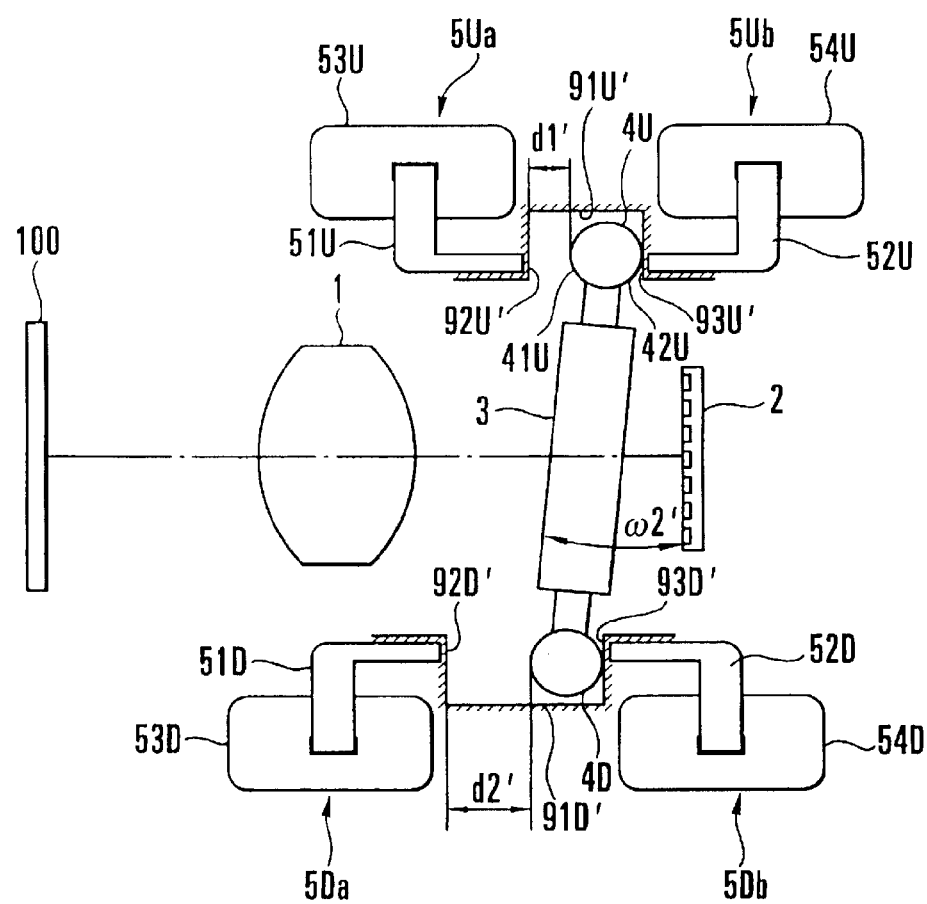
FIG. 14 is a diagrammatic view aiding in explaining the vertical pixel shifting operation of the pixel shifting system according to the second embodiment of the present invention.

In the state shown in FIG. 14, the inclination position of the parallel-plane plate 3 is restricted by the abutment between the armature 4U provided at the top end of the parallel-plane plate 3 and the position restricting surface 93U' in the recess 91U' and by the abutment between the armature 4D provided at the bottom end of the parallel-plane plate 3 and the position restricting surface 93D' in the recess 91D'. Specifically, the parallel-plane plate 3 is inclined from the state of FIG. 13 toward the right by one step as viewed in FIG. 13, and the incident position of the light beam on the image pickup surface of the image pickup element 2 is shifted downward on the image pickup surface. Incidentally, ω2' denotes the angle made by the image pickup surface and the parallel-plane plate 3 in the state shown in FIG. 14.

In the state shown in FIG. 14, if the electromagnet 5Ub is turned off and the electromagnet 5Ua is turned on, the armature 4U moves away from the position restricting surface 93U' in the recess 91U' and is attracted to the position restricting surface 92U' and positioned by abutment with the position restricting surface 92U'.

In addition, if the electromagnet 5Db is turned off and the electromagnet 5Da is turned on, the armature 4D provided at the bottom end of the parallel-plane plate 3 moves away from the position restricting surface 93D' in the recess 91D' and is attracted to the position restricting surface 92D' and positioned by abutment with the position restricting surface 92D'. Thus, the parallel-plane plate 3 goes to the state shown in FIG. 15.

In the state shown in FIG. 15, the inclination position of the parallel-plane plate 3 is restricted by the abutment between the armature 4U provided at the top end of the parallel-plane plate 3 and the position restricting surface 92U' in the recess 91U' and by the abutment between the armature 4D provided at the bottom end of the parallel-plane plate 3 and the position restricting surface 92D' in the recess 91D'. Specifically, the parallel-plane plate 3 is further inclined from the state of FIG. 14 toward the right by one step as viewed in FIG. 14, and the incident position of the light beam on the image pickup surface of the image pickup element 2 is shifted further downward on the image pickup surface. Incidentally, 3' denotes the angle made by the image pickup surface and the parallel-plane plate 3 in the state shown in FIG. 15.

In the state shown in FIG. 15, if the electromagnet 5Ua is turned off and the electromagnet 5Ub is turned on, the armature 4U provided at the top end of the parallel-plane plate 3 moves away from the position restricting surface 92U' in the recess 91U' and is attracted to the position restricting surface 93U' and positioned by abutment with the position restricting surface 93U'. On the other hand, the armature 4D provided at the bottom end of the parallel-plane plate 3 is positioned by the position restricting surface 92D' in the recess 91D'. Thus, the parallel-plane plate 3 goes to the state shown in FIG. 16.

Figure 16:
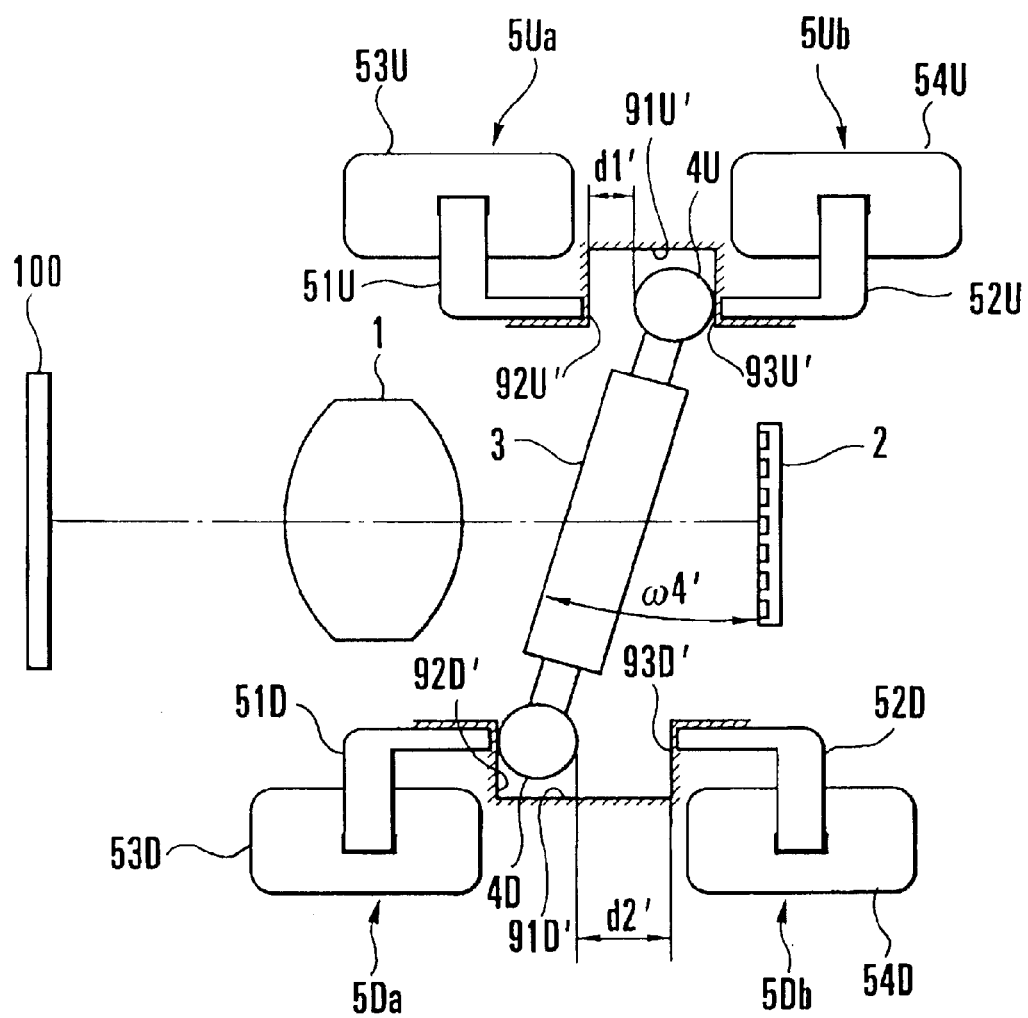
FIG. 16 is a diagrammatic view aiding in explaining the vertical pixel shifting operation of the pixel shifting system according to the second embodiment of the present invention.
Figure 17:
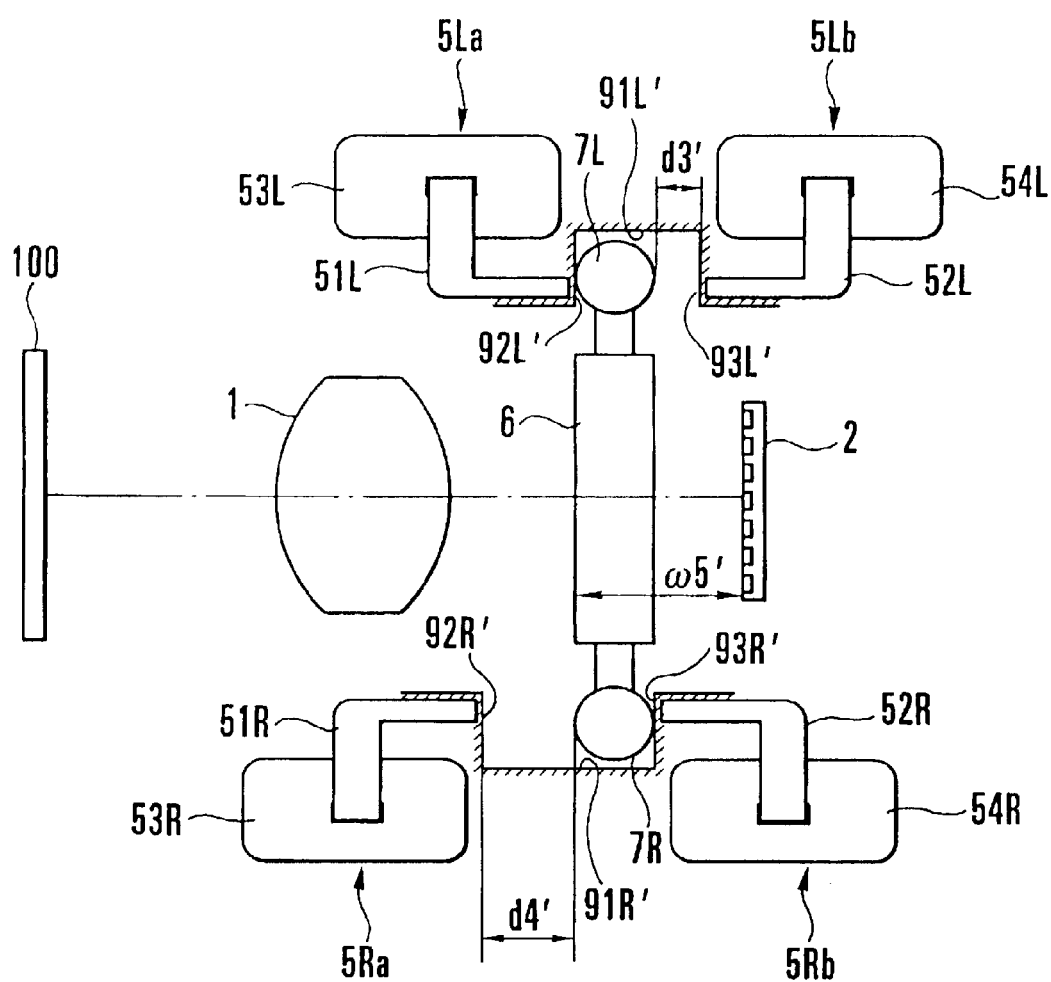
FIG. 17 is a diagrammatic view aiding in explaining the horizontal pixel shifting operation of the pixel shifting system according to the second embodiment of the present invention.
Figure 18:
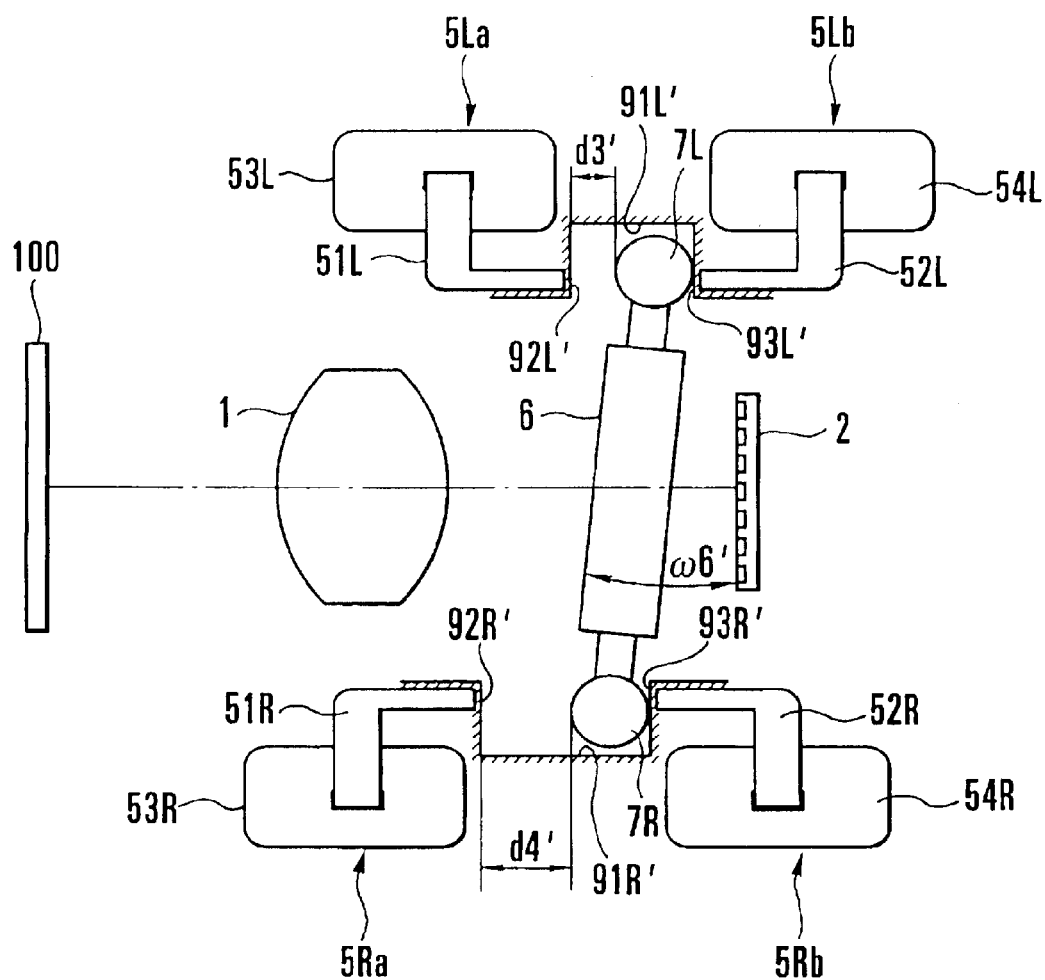
FIG. 18 is a diagrammatic view aiding in explaining the horizontal pixel shifting operation of the pixel shifting system according to the second embodiment of the present invention.
Figure 19:
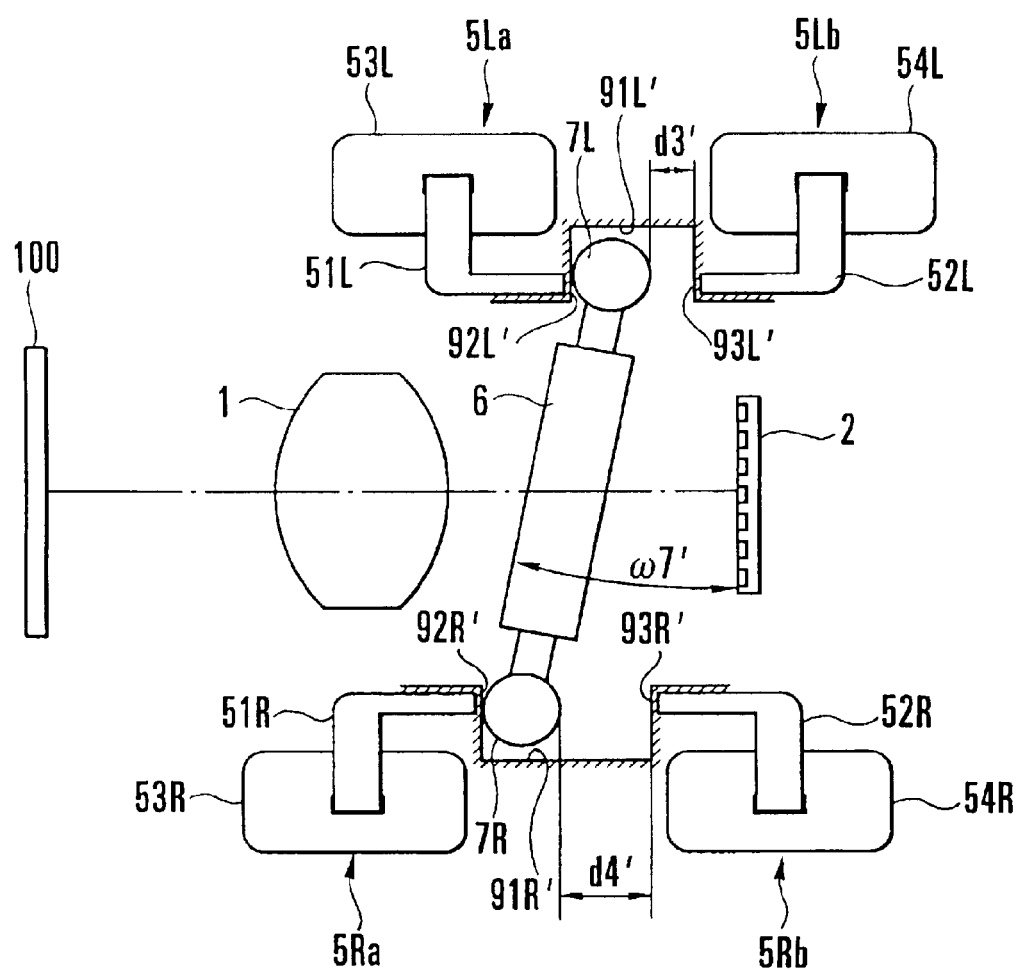
FIG. 19 is a diagrammatic view aiding in explaining the horizontal pixel shifting operation of the pixel shifting system according to the second embodiment of the present invention.
Figure 20:
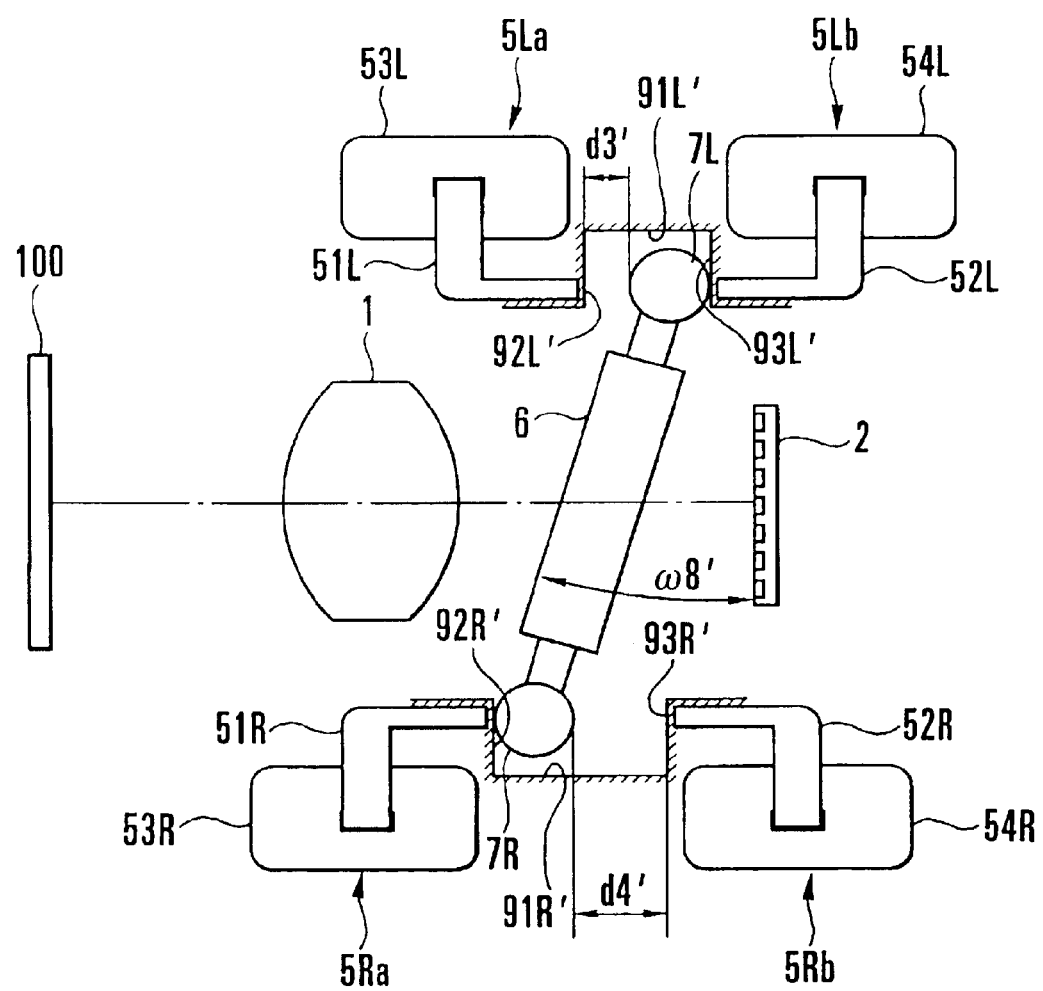
FIG. 20 is a diagrammatic view aiding in explaining the horizontal pixel shifting operation of the pixel shifting system according to the second embodiment of the present invention.

In the state shown in FIG. 16, the parallel-plane plate 3 is further inclined from the state of FIG. 15 toward the right as viewed in FIG. 16, and the inclination angle of the parallel-plane plate 3 reaches a maximum. Incidentally, $\omega 4'$ denotes the angle made by the image pickup surface and the parallel-plane plate 3 in the state shown in FIG. 16.

As is apparent from FIGS. 13 to 16, by sequentially varying the inclination of the parallel-plane plate 3 in the order of $\omega 1'$, $\omega 2'$, $\omega 3'$ and $\omega 4'$, it is possible to control the parallel-plane plate 3 to vary its inclination angle in four steps. Thus, the incident position of the light beam coming from the subject can be vertically shifted among four positions on the image pickup surface.

Incidentally, the angles $\omega 1'$ to $\omega 4'$ are selected to satisfy the following relation:

$$(\omega 2'-\omega 1')=(\omega 3'-\omega 2')=(\omega 4'-3')=\text{constant},$$

and this relation indicates that the incident position of the light beam on the image pickup surface is shifted at an equal pitch on the image pickup surface according to the variation in the inclination of the parallel-plane plate 3.

In the second embodiment, the clearance d1' between the armature 4U and the position restricting surface 92U' in the recess 91U' and the clearance d2' between the armature 4D and the position restricting surface 93D' in the recess 91D' are set so that the amount of shifting for one step becomes equal to half of the pixel-to-pixel distance of the image pickup element. The clearances d1' and d2', which determine the inclination angle of the parallel-plane plate 3, are varied according to the pixel-to-pixel distance of the image pickup element or the amount of shifting for one step.

Since each of the armatures which comes into abutment with either of the corresponding position restricting surfaces has a cylindrical shape, even if the position of abutment of each of the cylindrical armatures with either of the corresponding position restricting surfaces deviates in a longitudinal direction of the parallel-plane plate 3, the inclination angle of the parallel-plane plate 3 does not vary, so that the incident position of the light beam on the image pickup surface of the image pickup element does not vary.

In the above-described arrangement, the inclination of the parallel-plane plate 3 is set so that the incident position of the light beam on the image pickup surface is shifted at a pitch of half of the pixel-to-pixel distance of the image pickup surface, i.e., at a half pixel pitch for each inclination angle. Accordingly, it is possible to obtain the number of pixels which is substantially four times the number of vertical pixels of an actual image pickup element.

Thus, four images are picked up by the image pickup element for the respective inclination positions of the parallel-plane plate 3, and the picked-up four images are sequentially stored in a memory. During reading from the memory, the order of reading of each pixel of the four images is controlled so that the four images can be combined into one image of high image quality.

The above description has referred to the vertical pixel shifting on the image pickup surface. However, since the second embodiment of the present invention is also provided with a similar pixel shifting mechanism which performs horizontal pixel shifting, the second embodiment is capable of performing horizontal pixel shifting so that the number of pixels of the image pickup element can be made substantially four times, i.e., sixteen times in total.

FIGS. 17 to 20 are views aiding in explaining the operation of performing horizontal pixel shifting by sequentially varying the inclination angle of the horizontal parallel-plane plate 6.

Since the arrangement and the operation principle of the horizontal pixel shifting mechanism are the same as those of the vertical pixel shifting mechanism shown in FIGS. 13 to 16, the detailed description of the horizontal pixel shifting mechanism is omitted herein.

Incidentally, the inclination angle of the parallel-plane plate 6 is determined by position restricting surfaces 92L' and 93L' of a left recess 91L' in which the armature 7L mounted at the left end of the parallel-plane plate 6 is movably fitted and position restricting surfaces 92R' and 93R' of a right recess 91R' in which the armature 7R mounted at the right end of the parallel-plane plate 6 is movably fitted. Letting d3' be the clearance between the armature 7L and the width of the recess 91L', and letting d4' be the clearance between the armature 7R and the width of the recess 91R', the relation between d3' and d4' is set to d4'=2d3' in the second embodiment.

In the above-described arrangement, if the angle made by the image pickup surface and the parallel-plane plate 6 is stepwise varied (increased) in the order of $\omega 5'$, $\omega 6'$, $\omega 7'$ and $\omega 8'$ while the inclination angle of the parallel-plane plate 6 is being increased in the order of FIGS. 17, 18, 19 and 20, horizontal pixel shifting at an equal pitch can also be performed on the image pickup surface.

Incidentally, the angles $\omega 5'$ to $\omega 8'$ are selected to satisfy the following relation:

$$(\omega 6'-\omega 5')=(\omega 7'-\omega 6')=(\omega 8'-\omega 7')=\text{constant}.$$

In the second embodiment, the clearance d3' between the armature 7L and the position restricting surface 92L' or 93L' in the recess 91L' and the clearance D4 between the armature 7R and the position restricting surface 92R' or 93R' in the recess 91R' are set so that the amount of shifting for one step becomes equal to half of the horizontal pixel-to-pixel distance of the image pickup element. The clearances d3' and d4', which determine the inclination angle of the parallel-plane plate 6, are varied according to the pixel-to-pixel distance of the image pickup element or the amount of shifting for one step.

Incidentally, although the vertical pixel shifting shown in FIGS. 13 to 16 and the horizontal pixel shifting shown in FIGS. 17 to 20 are performed so as to sequentially increase the respective inclination angles of the parallel-plane plates 3 and 6, images are picked up for the respective inclination positions and stored in the memory so that the images can be combined into one image by processing to be performed at a later time. For this reason, the respective inclination angles of the parallel-plane plates 3 and 6 may be varied in arbitrary order. In other words, the vertical pixel shifting and the horizontal pixel shifting need not be limited to the order shown in FIGS. 13 to 16 and the order shown in FIGS. 17 to 20, and may be performed in arbitrary order as long as four images in the vertical direction and four images in the horizontal image, a total of sixteen images, can be picked up by controlling each of the electromagnets.

Furthermore, since the vertical pixel shifting mechanism and the horizontal pixel shifting mechanism are independent of each other, the direction and the order of pixel shifting by each of the vertical and horizontal pixel shifting mechanisms may be arbitrary. As a matter of course, while one image is being picked up, each of the parallel plates must be kept stationary.

FIG. 21 shows variations on a pixel-by-pixel basis in the incident position of a light beam on the image pickup surface, which variations correspond to the respective four states of the parallel-plane plate 3 shown in FIGS. 13 to 20.

In FIG. 21, the respective states of FIGS. 13 to 16 are conceptually shown in parts (1), (2), (3) and (4). By sequentially varying the inclination of the parallel-plane plate 3, the incident position of a light beam which would originally be made incident on only one point on the image pickup surface can be shifted among four locations. Accordingly, four light beams incident on four different locations which are spaced vertically apart from one another and some of which lie between vertically adjacent pixels, can be made incident on one pixel on the image pickup surface of the image pickup element.

In other words, it is possible to obtain image information carried by a light beam which would originally be incident on a non-photosensitive portion between each pixel on the image pickup surface or on a pixel other than a predetermined pixel. In consequence, it is possible to achieve an effect equivalent to an increase in the number of pixels per image pickup element.

In FIG. 21, reference numeral 2a denotes an image pickup surface of the image pickup element 2. Four kinds of color filters which respectively constitute pixels Cy (cyan), Ye (yellow), G (green) and Mg (magenta) are disposed on the image pickup surface 2a as shown in FIG. 21, and these four pixels constitute one pixel in the case of color image pickup.

As viewed in FIG. 21 in the vertical direction, if the inclination angle of the parallel-plane plate 3 is varied with respect to the optical axis, a light beam to be made incident on one position is sequentially shifted among four vertical locations which contain positions between adjacent pixels in which pixels are originally absent. In other words, it is possible to obtain, from each pixel, image information which originally cannot be obtained at that position because the incident position of a light beam indicative of the image information lies between adjacent pixels.

Furthermore, in accordance with the second embodiment of the present invention, since vertical four-step pixel shifting and horizontal four-step pixel shifting are performed without making a light beam incident on the same color pixel, it is possible to obtain the number of pixels which is simply substantially sixteen times (4×4) the number of pixels of the image pickup element 2, as shown in Part A of FIG. 21. In the case of an image pickup element having 1,300,000 pixels, if the pixel shifting system according to the present invention is applied to pixel shifting in either vertical or horizontal direction, it is possible to obtain an image of high quality which is equivalent to that of an image picked up by an image pickup element of 1,300,000×4=5, 200,000 pixels.

Accordingly, if the present pixel shifting is performed in both vertical and horizontal directions, it is possible to obtain an image of high quality which is equivalent to 5,200,000×4=20,800,000 pixels.

Third Embodiment

A third embodiment of the pixel shifting system according to the present invention will be described below.

As compared with the first embodiment, the feature of the third embodiment resides in a simplified driving system which includes electromagnets for driving parallel-plane plates, and reduced power consumption.

FIGS. 22(a) and 22(b) show the essential portion of the third embodiment. FIG. 22(a) is a front elevational view taken in the direction of the optical axis, and FIG. 22(b) is a top plan view.

As shown in each of FIGS. 22(a) and 22(b), the third embodiment differs from the first embodiment in that part of the electromagnets used in the first embodiment are replaced with springs. In FIGS. 22(a) and 22(b), identical reference numerals are used to denote constituent elements identical to those used in the first embodiment, and the description of such constituent elements is omitted for the sake of simplicity.

Specifically, the electromagnets 5Ua, 5Da, 8La and 8Ra (shown in FIG. 1(a)) are replaced with springs for urging the parallel-plane plates in the forward direction along the optical axis.

These springs are substituted for the attractions of the respective electromagnets 5Ua, 5Da, 8La and 8Ra, and the movement of each of the parallel-plane plates against the associated springs is achieved by the magnetic attraction of the corresponding ones of the electromagnets 5Ub, 5Db, 8Lb and 8Rb. With this arrangement, it is possible to reduce the required number of electromagnets (eight, in the first embodiment) to half (four, in the third embodiment).

Referring to FIG. 22(b), springs 10L and 10R for pulling the respective armatures 7L and 7R of the horizontal parallel-plane plate 6 in the forward direction along the optical axis are provided instead of the electromagnets 8La and 8Ra.

Although not shown, other springs are provided instead of the electromagnets 5Ua, 5Da, 8La and 8Ra shown in FIG. 1(a), and the arrangement of the springs will readily be understood from FIGS. 22(a) and 22(b).

Since the vertical pixel shifting operation of the parallel-plane plate 3 and the horizontal pixel shifting operation of the parallel-plane plate 6 are as described previously with reference to FIGS. 4 to 11, 13 to 16 and 17 to 20 in connection with the first and second embodiments, the description of the operation of the third embodiment is omitted herein.

The arrangement and the operation of the pixel shifting system according to the present invention are as described above, and the following description will refer to an arrangement in which such a pixel shifting system is actually incorporated in a lens barrel or a camera body.

Figure 23A:
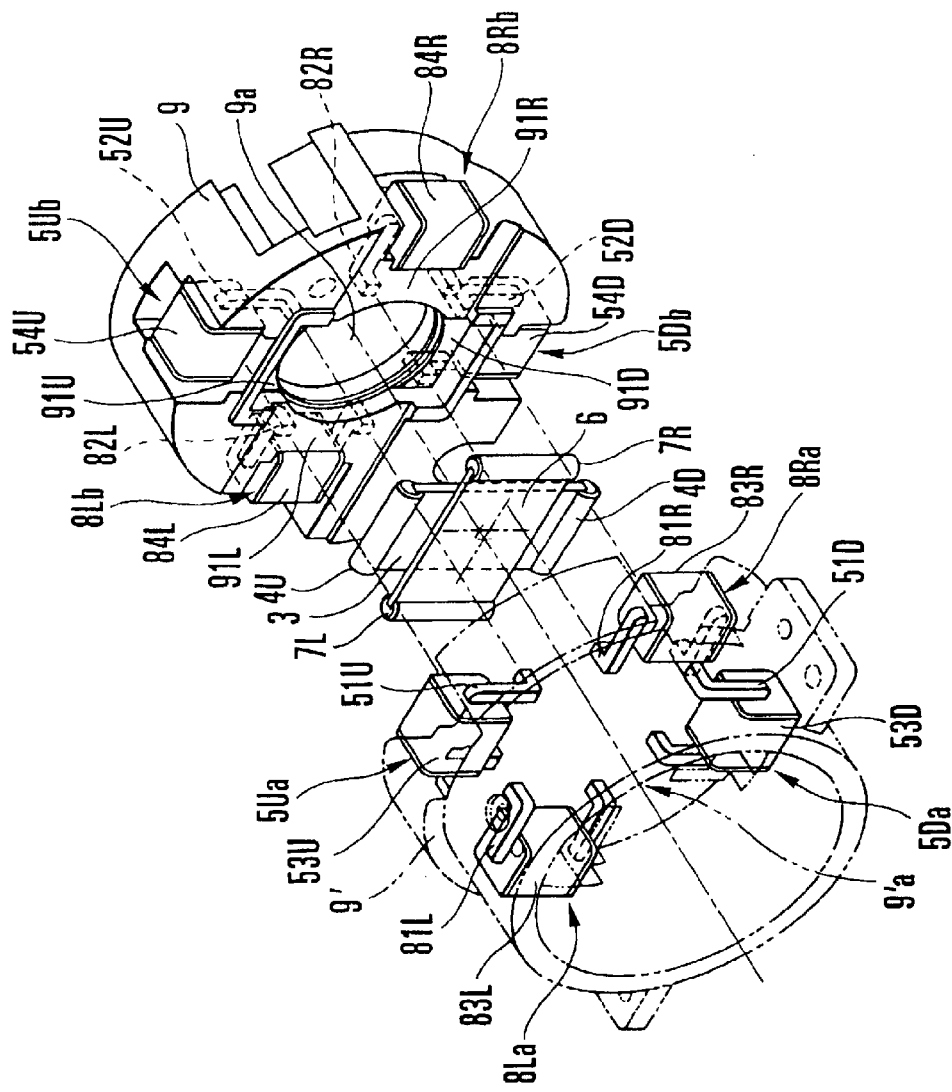
FIGS. 23(a) and 23(b) are exploded perspective views showing an arrangement in which a pixel shifting system according to any of the embodiments of the present invention is incorporated as a unit.

FIG. 23(a) is an exploded perspective view of a pixel shifting unit in which the pixel shifting mechanism according to the first (or second) embodiment of the present invention is incorporated.

In FIG. 23(a), reference numerals 9 and 9' denote frames each of which supports the corresponding electromagnets and parallel-plane plates. The frames 9 and 9' are separated from each other in the direction of the optical axis, and each of them has an opening through which to pass a light beam at a location centered about the optical axis.

The electromagnets 5Ub, 5Db, 8Lb and 8Rb are disposed at predetermined positions of the joining surface of the rear frame 9' which surrounds the opening 9a of the rear frame 9 and is opposed to the front frame portion 9'. The position restricting surface 93U and 93D; 93L and 93R are respectively formed in the recesses 91U and 91D; 91L and 91R into which to insert the vertical and horizontal parallel-plane plates 3 and 6, respectively.

The respective yokes 52U and 52D of the electromagnets 5Ub and 5Db are exposed at positions opposed to the armatures 4U and 4D of the parallel-plane plate 3, while the respective yokes 82L and 82R of the respective electromagnets 8Lb and 8Rb are exposed at positions opposed to the armatures 7L and 7R of the parallel-plane plate 6.

The front frame 9' which is opposed to the rear frame 9 has the electromagnets 5Ua, 5Ub, 5Da and 5Db at positions opposed to the respective electromagnets 5Ub, 5Db, 8Lb and 8Rb. The position restricting surface 92U, 92D, 92L and 92R are respectively formed in the recesses 91U, 91D, 91L and 91R.

Accordingly, by connecting the front frame 9' and the rear frame 9, the vertical and horizontal parallel-plane plates 3 and 6 and the electromagnets for controlling the positions of the parallel-plane plates 3 and 6 can be supported as shown in FIGS. 1 to 11 and 13 to 20.

Figure 23B:
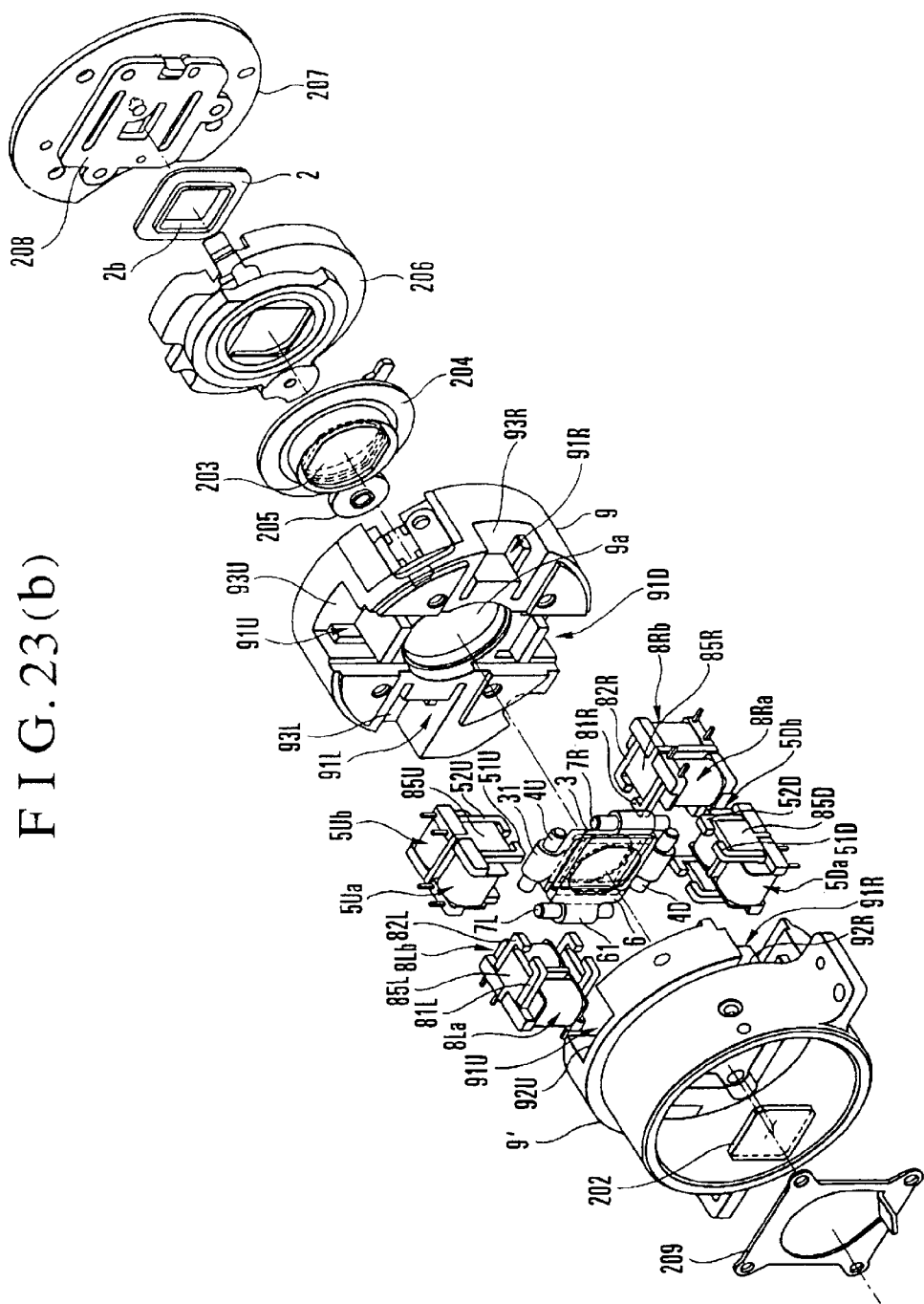

FIG. 23(b) is an exploded perspective view showing in detail the arrangement of the pixel shifting unit shown in FIG. 23(a) and its peripheral members. In FIG. 23(b), identical reference numerals are used to denote constituent elements identical to those shown in FIG. 23(a), and the description thereof is omitted for the sake of simplicity. In actual incorporation into a product, each pair of the opposed electromagnets (5Ua and 5Ub, 5Da and 5Db, 8La and 8Lb, 8Ra and 8Rb) is integrated into one unit and the spaces between the opposed yokes 51U and 52U, 51D and 52D, 81L and 82L, and 81R and 81L are restricted by spacers 85L, 85R, 85U and 85D, respectively In addition, since the peripheral portion of the pixel shifting unit is restricted, the pixel shifting unit can be readily incorporated.

The parallel-plane plates 3 and 6 are respectively supported by support frames 31 and 61, and a pair of cylindrical armatures each of which comes into abutment with either of the corresponding yokes are mounted at the opposite ends of each of the parallel-plane plates 3 and 6.

These electromagnet units and the parallel-plane plates are supported in the space formed between the front frame 9' and the rear frame 9.

In FIG. 23(b), reference numeral 202 denotes a low-pass filter, and reference numeral 209 denotes a member for connecting the pixel shifting unit composed of the frames 9' and 9 to a lens unit which will be described later.

A low-pass filter 203 which differs in low-pass filtering direction from the low-pass filter 202 is supported for rotation about the optical axis in the rear frame 9 by a low-pass filter supporting frame 206, and a gear portion 204 disposed around the low-pass filter 203 is rotationally controlled by a motor 205.

The low-pass effect of the low-pass filters 202 and 203 can be turned on or off by the relative rotation between the low-pass filters 202 and 203. Specifically, during a moving-image pickup mode or a normal-resolution image pickup mode, the low-pass filters 202 and 203 are controlled to serve a low-pass filter function, whereas during a high-resolution image pickup mode which uses pixel shifting, the low-pass filters 202 and 203 are controlled to cancel the low-pass filter function.

In other words, the low-pass effect of the low-pass filters 202 and 203 can be controlled by rotationally driving the motor 205 according to the kind of image pickup mode.

The CCD image pickup element 2 is positionally adjustably mounted on a base plate 207 via a mounting support plate 208 behind the low-pass filter supporting frame 206.

If the structure shown in FIG. 23(b) is integrated with a lens unit, it is possible to realize a lens unit provided with a pixel shifting system. This feature makes it possible to realize an interchangeable lens provided with a pixel shifting mechanism.

Figure 24:
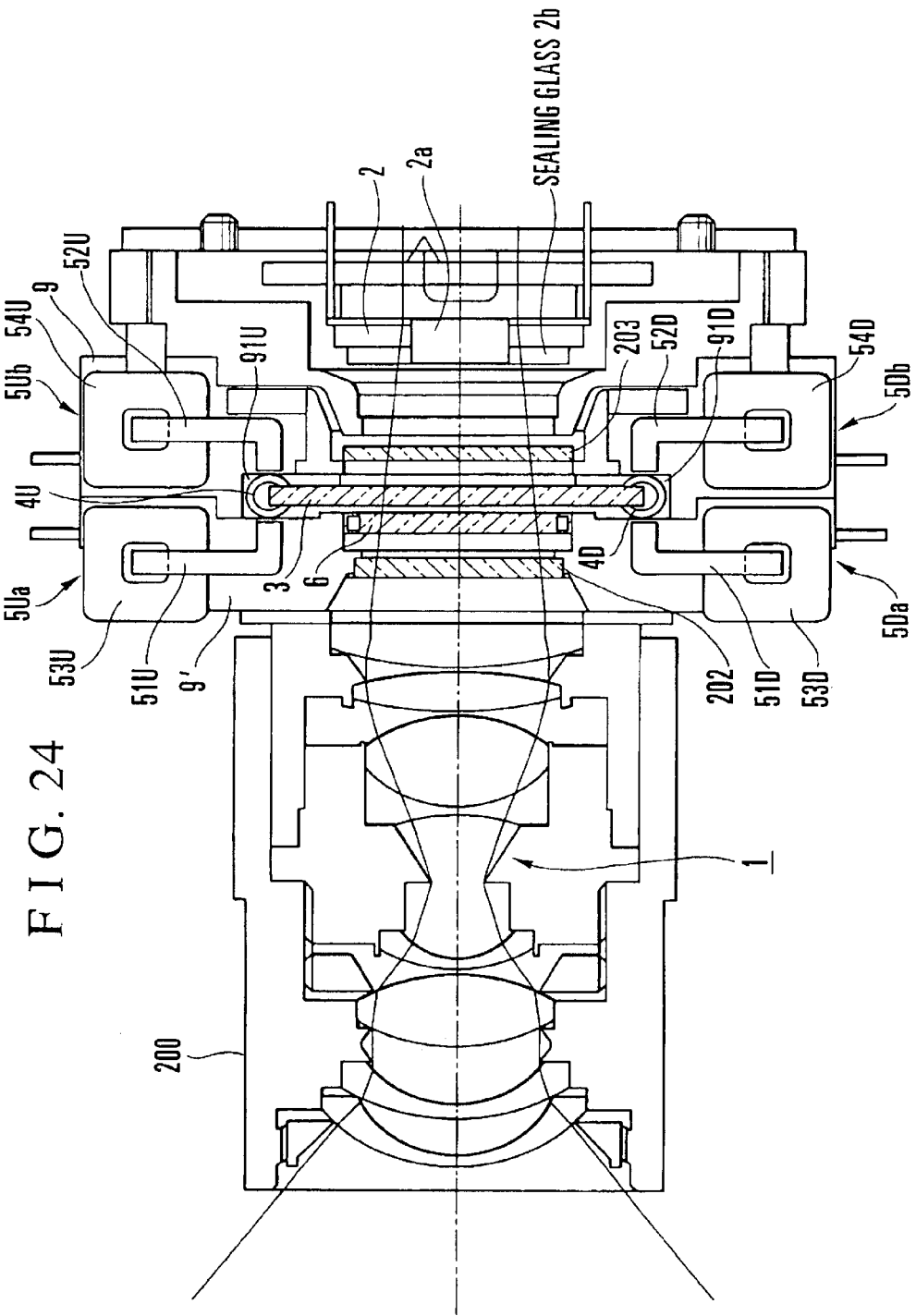
FIG. 24 is a diagrammatic cross-sectional view showing an arrangement in which the unit of a pixel shifting mechanism according to any of the embodiments of the present invention is actually incorporated into a camera.

FIG. 24 is a cross-sectional side view showing an arrangement in which the aforesaid pixel shifting unit is incorporated in a lens unit or a camera body.

As shown in FIG. 24, a photographing lens optical system 1 is disposed in a lens barrel 200, and the pixel shifting unit shown in FIG. 23(a) is disposed on the mount portion of the lens barrel 200.

The pixel shifting unit is composed of the front frame 9' and the rear frame 9. As shown in FIG. 24, the LPF (optical low-pass filter) 202 for limiting the spatial frequency of an incident light beam, the horizontal parallel-plane plate 6, the vertical parallel-plane plate 3 and the LPF (optical low-pass filter) 203 are disposed in that order in the pixel shifting unit, and the image pickup element 2 is disposed behind the pixel shifting unit. In FIG. 24, reference numeral 2a denotes an effective image pickup surface (image pickup area) of the image pickup element 2, and reference numeral 2b denotes a sealing glass for the image pickup surface of the image pickup element 2.

An infrared cut-filter may be disposed, as by coating a surface of the parallel-plane plate 3 or 6. Further, the parallel-plane plate 3 or 6 is made of infrared absorption glass.

The LPFs 202 and 203 cooperate in band-limiting the spatial frequency of an incident light beam, thereby eliminating moire or the like due to a fold-back effect. The LPF 203 is rotatably disposed so that the effect of the LPFs 202 and 203 can be cancelled by rotating the wavelength of the incident light beam according to the rotation of the LPF 203.

Accordingly, if it is necessary to remove the band-limiting effect of the LPFs 202 and 203 in order to pick up an image of particularly high quality, the LPFs 202 and 203 need only to be relatively rotated without being removed from the camera body. An arrangement for relatively rotating these two optical low-pass filters and cancelling the low-pass function thereof, and the contents of the operation of such arrangement are described in detail in Japanese Laid-Open Patent Application No. Hei 7-245762, and the description of the arrangement is omitted herein for the sake of simplicity.

A circuit (image processing circuit) for driving the aforesaid pixel shifting mechanism will be described below with reference to FIG. 25.

Figure 25:
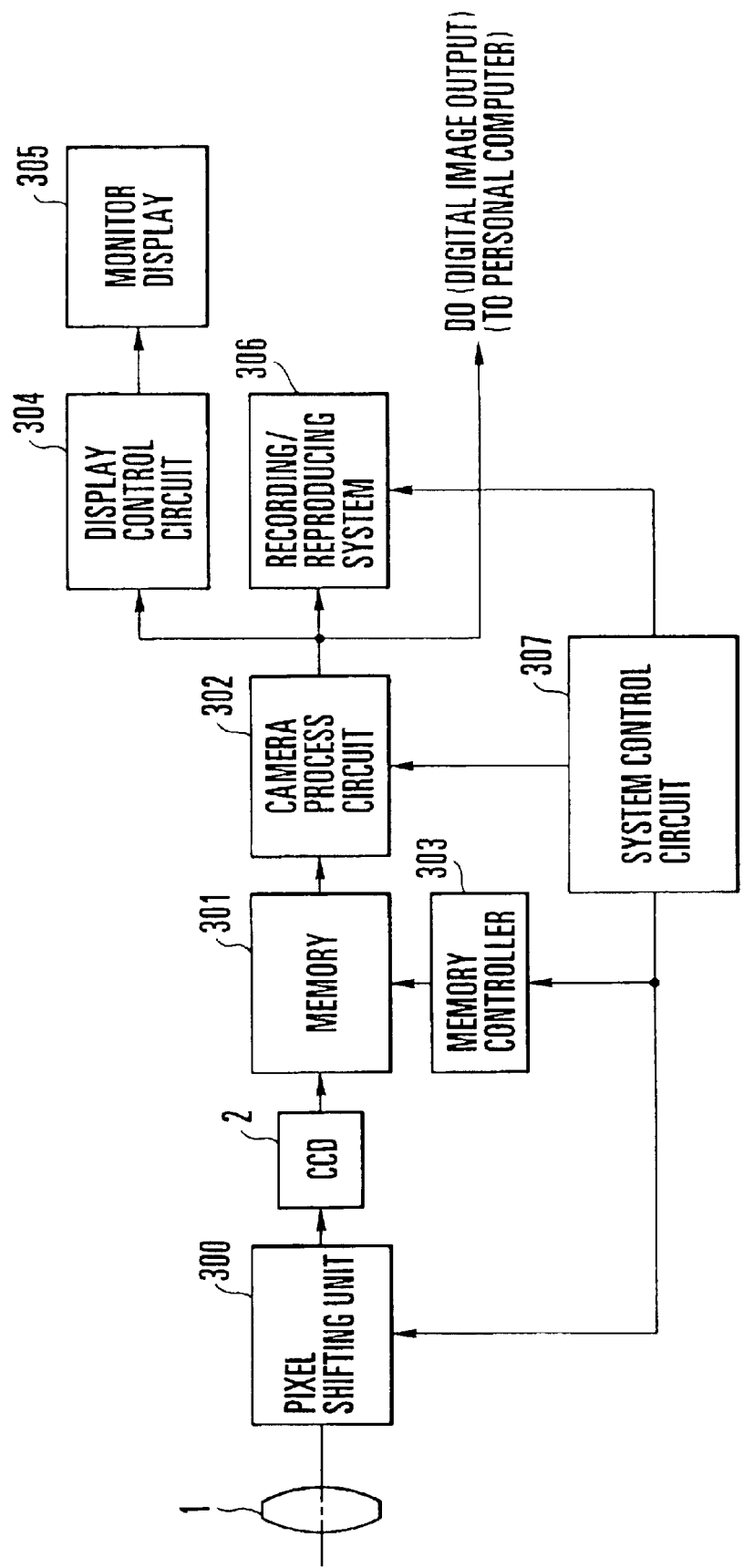
FIG. 25 is a block diagram showing a circuit arrangement for picking up an image by using the pixel shifting system according to any of the embodiments of the present invention.

Referring to FIG. 25, a pixel shifting unit is disposed in the space between the image pickup lens unit 1 and the image pickup element 2.

A picked-up image signal outputted from the image pickup element 2 is stored in a memory 301. The image data read from the memory 301 is supplied to a camera process circuit 302, and the camera process circuit 302 produces a luminance signal and a chrominance signal. The luminance signal and the chrominance signal are supplied to a recording/reproducing system 306 and recorded on a recording medium which not shown.

The luminance signal and the chrominance signal are also supplied to a display control circuit 304. The display control circuit 304 converts both signals into a signal format suited to display on a monitor, and the obtained signal is visually displayed on a monitor display 305.

In addition, the output signal of the camera process circuit 302 may be directly outputted to an external apparatus such as a personal computer through a digital image output terminal DO in the form of a digital image signal.

The image processing circuit having the above-described arrangement is controlled by a system control circuit 307 composed of a microcomputer.

In other words, a pixel shifting unit 300 is controlled to sequentially control the vertical and horizontal parallel-plane plates, thereby performing pixel shifting.

In the third embodiment of the present invention, the system control circuit 307 controls the parallel-plane plate 3 to perform vertical pixel shifting of four steps and, in each of the four steps, controls the parallel-plane plate 6 to perform horizontal pixel shifting of four steps. Accordingly, it is possible to obtain four images in the vertical direction and four images in the horizontal direction, a total of sixteen images.

Each of these images is sequentially stored in the memory 301 which is being controlled by a memory controller 303. After all the images have been stored in the memory 301, the images are read from the memory 301 to combine the images into one image, while reading from the memory 301 is being sequentially controlled on a pixel-by-pixel basis. The obtained image signal is supplied to the camera process circuit 302, in which it is subjected to luminance signal processing and chrominance signal processing so that an image signal of high image quality can be obtained.

Incidentally, the signal read from the memory 301 may be outputted to an external apparatus such as a personal computer so that various kinds of image processing can be performed on the side of the external apparatus.

With the above-described processing, it is possible to pick up an image of high image quality which is equivalent to that of an image picked up by an image pickup element, the number of pixels of which is greater than the actual number of pixels of the image pickup element 2.

As described above, in the pixel shifting system according to each of the embodiments of the present invention, not motors but electromagnetic driving means such as electromagnets are used as a driving source in the pixel shifting system, while not mechanisms such as complicated cams but abutment spaces are used as position controlling means in the pixel shifting system, and the abutment spaces for position control have different sizes so that the respective inclination positions of pixel shifting optical elements such as parallel-plane plates are individually controlled. Accordingly, the number of members which need to have high dimensional accuracy can be minimized, and particular support shafts for controlling the inclination positions of the optical elements can be eliminated, so that it is possible to realize a pixel shifting system which is capable of obtaining a plurality of stable optical positions by means of a simple mechanism which can operate at high speed by a simple control method.

As is apparent from the foregoing description, in each of the embodiments of the present invention, a plurality of restricting portions for restricting the position of an optical element movable in the direction of the optical axis are formed at the opposite ends of the optical element for shifting the incident position of a light beam on a image pickup surface, and the inclination position of the optical element is controlled by bringing the optical element into selective abutment with the restricting portions. Accordingly, a pixel shifting operation basically can be realized by a simple mechanism which only brings the optical element into selective abutment with the restricting portions. In addition, since the optical element is positioned by being selectively brought into direct abutment with the restricting surfaces, an extremely high-speed pixel shifting image pickup operation can be realized.

In addition, in spite of a simple arrangement, it is possible to attain extremely high positioning accuracy by selectively bringing the optical element directly into abutment with the restricting surfaces. Since it is unnecessary to use complicated mechanisms which would have been incorporated in a conventional arrangement, such as a mechanism for supporting the optical element and a mechanism such as a cam for controlling the inclination position of the optical element, it is possible to achieve reductions in cost and mounting space.

The position restricting surfaces are formed before and behind each end portion of the optical element in the direction of the optical axis so that the combination of the position restricting surfaces which each end portion of the optical element selectively comes into abutment with can be modified to control the optical element to cause it to move among a plurality of inclination angles. In addition, the inclination angle of the optical element can be controlled among various angles by appropriately varying the amount of movement of each end portion of the optical element and the ratio of the amount of movement at one end to the amount of movement at the other end. Accordingly, it is possible to realize high-speed and high-precision pixel shifting by means of an extremely simple arrangement.

Furthermore, since each engagement part of the optical element is brought in point or line contact with either of the corresponding restricting surfaces during selective abutment therewith, even if a variation occurs in the position of engagement of the engagement part of the optical element (parallel-plane plate) with either of the corresponding restricting surfaces and a positional deviation of the engagement part occurs in a plane parallel to the image pickup surface, the angle of inclination of the optical element can be kept constant and such positional deviation can be prevented from affecting the amount of pixel shifting.

Furthermore, since a cylindrical member for line contact (or a plurality of point contact members) or the like is employed, it is possible to realize high-precision positioning without causing a lengthwise inclination of the cylindrical member with respect to the restricting surfaces.

Furthermore, since the driving means are composed of a plurality of electromagnets which are provided for the respective restricting surfaces, it is possible to vary the inclination position of the optical member at high speed by means of a simple arrangement which only performs on-off control of the electromagnets.

Furthermore, since the driving means may be composed of elastic members and electromagnets, it is possible to further simplify the arrangement of the pixel shifting system.

Furthermore, by disposing a plurality of similar optical elements in an optical path, it is possible to increase the number of steps for pixel shifting and to finely control the amount of pixel shifting per step, and it is also possible to vary the direction of pixel shifting.

Specifically, the optical elements include a vertical optical element for vertically shifting the incident position of a light beam on the image pickup surface and a horizontal optical element for horizontally shifting the incident position of a light beam on the image pickup surface, so that it is possible to realize pixel shifting in both vertical and horizontal directions, i.e., a further improvement in image quality.

Furthermore, since such optical units are incorporated in a lens unit, a pixel shifting unit having the above-described high-speed, high-precision and simple arrangement can be supplied to various image pickup apparatus in the form of an integrated lens unit, and the adjustment required on a user side can be simplified. It is, therefore, possible to provide a highly versatile system.

What is claimed is:

1. An optical apparatus comprising:
    an optical element for shifting a position of an incident light beam on an image forming plane;
    first and second restricting portions for setting an inclination position of said optical element with respect to an optical axis by respectively restricting first and second end portions of said optical element; and
    first and second driving means for driving said optical element to said first and second restricting portions, wherein said driving means is set up in each of said first and second restricting portions independently
    wherein said optical element includes first and second electromagnet circuits,
    wherein said first electromagnet circuit includes a first magnet arranged in a part which electromagnet force of said first driving means acts on,
    wherein said second electromagnet circuit includes a second magnet arranged in a part which electromagnet force of said second driving means acts on,
    wherein said first and second electromagnet circuits are arranged to be driven independently by switching operation of said first and second driving means.

2. An optical apparatus according to claim 1, wherein each of said first and second portion has position restricting surfaces formed before and behind a corresponding one of the first and second magnets of said optical element in the direction of the optical axis, an inclination angle of said optical element relative to the optical axis being determined in such a way that the position of each of the first and second magnets in the direction of the optical axis is restricted by the position restricting surfaces in a corresponding one of said first and second portion said optical element being capable of being controlled to move among a plurality of inclination angles, by changing a combination of the position restricting surfaces which the first and second magnets of said optical element selectively come into abutment with.

3. An optical apparatus according to claim 2, wherein said first and second portion are formed so that a distance between the position restricting surfaces opposed to each other in one of said first and second portion becomes equal to a distance between the position restricting surfaces opposed to each other in another of said position restricting surfaces and amounts of movement of said optical element in the direction of the optical axis at the respective first and second magnets become equal to each other.

4. An optical apparatus according to claim 3, wherein positions of the position restricting surfaces in said first and second portion at one of the first and second magnets of said optical element and positions of the position restricting surfaces in said first and second portion at another of the first and second magnets of said optical element are the same as each other in the direction of the optical axis.

5. An optical apparatus according to claim 3 or 4, wherein said optical element has at least three image shifting positions which stand in a line in the same direction, including a first position where the respective first and second magnets of said optical element are brought in abutment with the position restricting surfaces which are located in said respective first and second portion on one side in the direction of the optical axis, a second position where the respective first and second magnets are brought in abutment with the position restricting surfaces which are located in said respective first and second portion on sides which differ from each other in the direction of the optical axis, and a third position where the respective first and second magnets are brought in abutment with the position restricting surfaces which are located in said respective first and second portion on sides which differ from each other in the direction of the optical axis in opposite relation to the sides selected for the second position.

6. An optical apparatus according to claim 2 or 5, wherein said optical clement is a parallel-plane plate provided in an optical path of the light beam and is arranged to shift the incident position of the light beam on the image forming surface by controlling an inclination angle of the parallel-plane plate relative to the optical axis.

7. An optical apparatus according to claim 2, wherein engagement portions which selectively come into line or point contact with the position restricting surfaces in said respective first and second portion are provided at the respective first and second magnets of said optical element each of which selectively comes into abutment with the position restricting surfaces in the corresponding first and second portion.

8. An optical apparatus according to claim 7, wherein each of said engagement portions is a cylindrical member which selectively comes into line contact with the position restricting surfaces.

9. An optical apparatus according to claim 2 or 8, wherein said driving means includes a plurality of electromagnets provided for the respective position restricting surfaces and is arranged to vary the inclination position of said optical element by performing on-off control of each of the electromagnets to select the position restricting surfaces which said optical element comes into abutment with.

10. An image shifting method for shifting an incident position of a light beam on an image forming plane, comprising the steps of:
    restricting an inclination position of an optical element having provided in an optical path relative to an optical axis, by selectively bringing first and second end portions of said optical element into abutment with first and second position restricting surfaces, respectively;
    setting an inclination angle of said optical element relative to the optical axis by selecting said first and second position restricting surfaces which the first and second end portions are to be brought into abutment with, wherein said selecting is set up at each of said first and second position restricting surfaces independently by a switching operation of applying an electromagnetic force to a first electromagnet in a first electromagnetic circuit included in said optical element and applying an electromagnetic force to a second electromagnet in a second electromagnet circuit included in said optical element.

11. An image shifting method according to claim 10, wherein the position restricting surfaces are formed before and behind each of the first and second magnets of the optical element in the direction of the optical axis so that an amount of movement of the optical element in the direction of the optical axis is restricted by a distance between the position restricting surfaces opposed to each other.

12. An image shifting method according to claim 11, wherein the distances at the respective first and second magnets of the optical element are set to each other.

13. An image shifting method according to claim 12, wherein positions of the position restricting surfaces in the direction of the optical axis at one of the first and second magnets of the optical element are set equal to positions of the position restricting surfaces in the direction of the optical axis at one of the first and second magnets of the optical element.

14. An image shifting method according to claim 13 wherein the optical element is positioned at least three image shifting positions which stand in a line in the same direction, including a first position where the respective first and second magnets of the optical element are brought in abutment with the position restricting surfaces which are located in the respective first and second portion on one side in the direction of the optical axis, a second position where the respective first and second magnets are brought in abutment with the position restricting surfaces which are located in the respective first and second portion on sides which differ from each other in the direction of the optical axis, and a third position where the respective first and second magnets are brought in abutment with the position restricting surface which are located in the respective first and second portion on sides which differ from each other in the direction of the optical axis in opposite relation to the sides selected for the second position.

15. An image shifting method according to claim 10, or 14, wherein said optical element is a parallel-plane plate provided in an optical path extending to the image forming surface and is arranged to shift the incident position of the light beam on the image forming surface by controlling the inclination angle of the parallel-plane plate relative to the optical axis.

16. An image shifting method according to claim 10 or 12, wherein in the optical path are provided a vertical optical element for shifting the incident position of the light beam on the image forming surface in three vertical directions on the image forming surface and a horizontal optical element for shifting the incident position of the light beam on the image forming surface in three horizontal directions on the image forming surface.

17. An image pickup apparatus comprising:

an optical element for shifting a position of an incident light beam on an image forming plane of image pickup means;

first and second recess portions each of which supports said optical element within a predetermined moving range at least in a direction of an optical axis with first and second end portions of said optical element being independently movably fitted in said first and second recess portions, respectively;

first and second restricting portions formed in said first and second recess portions, for setting an inclination position of said optical element with respect to the optical axis, by coming into abutment with said first and second end portions of said optical element and restricting a moving range of said first and second end portions in the direction of the optical axis; and first and second driving means for driving said first and second restricting portions to bring said first and second end portions of said optical element into abutment with said first and second position restricting portions in said first and second recess portions, wherein said first and second driving means are set up in said first and second restricting portions independently wherein said optical element includes first and second electromagnet circuits, wherein said first electromagnet circuit includes a first magnet arranged in a part which electromagnet force of said first driving means acts on, wherein said second electromagnet circuit includes a second magnet arranged in a part which electromagnet force of said second driving means acts on, wherein said first and second electromagnet circuits are arranged to be driven independently by switching operation of said first and second driving means.

18. An image pickup apparatus according to claim 17, wherein said recess portions are formed so that a distance between said first and second portion opposed to each other in one of said recess portions at the respective end portions first and second magnets of said optical element becomes equal to a distance between said first and second portion opposed to each other in another of said recess portions and amounts of movement of said optical element in the direction of the optical axis at the respective first and second magnets become equal to each other.

19. An image pickup apparatus according to claim 18, wherein said first and second portion in each of said recess portions are formed before and behind each of the first and second magnets of said optical element in the direction of the optical axis, the position of each of the first and second magnets of said optical element in the direction of the optical axis is restricted by said first and second portion in a corresponding one of said first and second portion, and positions of said first and second portion at one of the first and second magnets of said optical element and positions of said first and second portion at another of the first and second magnets of said optical element are the same as each other in the direction of the optical axis.

20. An image pickup apparatus according to claim 19, wherein said optical element has at least three image shifting positions which stand in a line in the same direction, including a first position where the respective first and second magnets of said optical element are brought in abutment with said first and second portion which are located in said respective recess portions on one side in the direction of the optical axis, a second position where the respective first and second magnets are brought in abutment with the first and second portion which are located in said respective recess portions on sides which differ from each other in the direction of the optical axis, and a third position where the respective first and second magnets are brought in abutment with said first and second portion which are located in said respective recess portions on sides which differ from each other in the direction of the optical axis in opposite relation to the sides selected for the second position.

21. An image pickup apparatus according to claim 17, or 20, wherein said optical element includes a plurality of optical elements, a plurality of recess portions being provided for each of said plurality of optical elements, said optical apparatus being arranged to determine an entire amount of image shifting by combining amounts of image shifting of the light beam according to respective inclination positions of said plurality of optical elements.

22. An image pickup apparatus according to claim 21, wherein said optical element includes a vertical optical element for shifting the incident position of the light beam on the image forming surface in three vertical directions on the image forming surface and a horizontal optical element for shifting the incident position of the light beam on the image forming surface in three horizontal directions on the image forming surface.

23. An image pickup apparatus according to claim 17 or 22, wherein said optical element is a parallel—pane plate and said driving means is arranged to drive the parallel—plane plate by means of the plurality of electromagnets.

24. An image pickup apparatus comprising:

an image pickup lens group for forming an optical image;

an image pickup element for converting optical-image information supplied from said image pickup lens group into an electrical signal;

two optical elements shaped like a parallel-plane plate and disposed in a plane substantially perpendicular to an optical axis between said image pickup lens group and said image pickup element;

engagement portions provided integrally with each of said two optical elements at opposite end portions thereof, respectively;

restricting members each having position restricting portions formed before and behind a corresponding one of said engagement portions in a direction of the optical axis with a predetermined gap defined between said position restricting portions, independently each of said restricting members permitting a corresponding one of said engagement portions to move within a spatial range formed by the predetermined gap and restricting a movement position of the corresponding one of said engagement portions in the direction of the optical axis by means of said position restricting portions; and control means for controlling independently said restricting members to move each of said two optical elements among the first inclination position where said respective engagement portions at the opposite end portions of said optical element are brought in abutment with said position restricting portions which are located in said respective restricting members on one side in the direction of the optical axis, a second position where said respective engagement portions at the opposite end portions of said optical element are brought in abutment with said position restricting portions which are located in said respective restricting portions on sides which differ from each other in the direction of the optical axis, and a third position where said respective engagement portions at the opposite end portions of said optical element are brought in abutment with said position restricting portions which are located in said respective restricting portions on sides which differ from each other in the direction of the optical axis in opposite relation to the side selected for the second position.

25. An image pickup apparatus according to claim 24, wherein the predetermined gaps defined by said respective restricting members at the opposite ends of said optical element are equal to each other.

* * * * *

UNITED STATES PATENT AND TRADEMARK OFFICE
CERTIFICATE OF CORRECTION

PATENT NO. : 6,771,310 B1
DATED : August 3, 2004
INVENTOR(S) : Tomohiko Torita et al.

It is certified that error appears in the above-identified patent and that said Letters Patent is hereby corrected as shown below:

Column 5,
Line 52, delete "deviation 8" and insert -- deviation $\delta$ --.

Column 10,
Line 12, delete "recess 91u" and insert -- recess 91U --.

Column 17
Line 10, delete "3' denotes" and insert -- $\omega 3'$ denotes --.

Column 28,
Lines 22-23, delete "repective end portions first and second" and insert -- respective first and second --.

Column 29,
Line 10, delete "pane plate" and insert -- plane plate --.

Signed and Sealed this

Fourth Day of April, 2006

JON W. DUDAS
*Director of the United States Patent and Trademark Office*